United States Patent [19]

Leblanc et al.

[11] 4,257,994

[45] Mar. 24, 1981

[54] METHOD AND APPARATUS FOR INJECTION MOLDING SOLID STEEL-BANDED PRESS-ON INDUSTRIAL RUBBER TIRES

[75] Inventors: Raymond F. Leblanc; Donald M. Taylor, both of North Canton; Robert W. Hartney, Akron, all of Ohio

[73] Assignee: Teledyne Industries, Inc., Los Angeles, Calif.

[21] Appl. No.: 120,494

[22] Filed: Feb. 11, 1980

[51] Int. Cl.³ .......................... B29C 1/00; B29D 3/00; B29G 5/02
[52] U.S. Cl. ..................... 264/102; 249/83; 249/91; 264/259; 264/334; 264/328.11; 425/38; 425/117; 425/125; 425/127; 425/129 R; 425/542; 425/546; 425/554; 425/555
[58] Field of Search .............................. 249/83, 84, 91; 264/101, 102, 219, 259, 275, 326, 328, 334, 347, 329; 425/110, 117, 125, 127, 128, 129 R, 352, 354, 542, 546, 554, 35, 38, 47, 555

[56] References Cited

U.S. PATENT DOCUMENTS

| | | | |
|---|---|---|---|
| 1,351,156 | 8/1920 | Burnett et al. | 425/35 |
| 1,386,512 | 8/1921 | Lambert | 425/37 |
| 1,411,672 | 4/1922 | Schrank | 425/37 |
| 1,450,256 | 4/1923 | Goodenberger | 425/35 |
| 1,688,869 | 10/1928 | Lambert | 425/35 |
| 1,697,438 | 1/1929 | Wagenhorst | 425/35 |
| 1,779,396 | 10/1930 | Keller | 425/35 |
| 1,781,658 | 11/1930 | Keller | 425/35 |
| 2,386,034 | 10/1945 | Church | 425/38 |

Primary Examiner—W. E. Hoag
Attorney, Agent, or Firm—Frease & Bishop

[57] ABSTRACT

A method of and apparatus for injection molding solid steel-banded industrial rubber tires wherein a steel band is inserted in the bottom mold member cavity when the top mold member is in open position. Bite ring and knockout member components are contained in mold member cavity recesses. Closing movement of the mold members to mated position seals the bite ring and knockout member components against the steel bank and mold member recess surfaces to prevent leakage of injected rubber compound from the cavity during injection and curing. The mold has an internal wedge member which expands a split ring against the steel band when the mold is closed to prevent band distortion from pressure existing when the mold is injected and the rubber is cured therein to form the tire tread portion which is bonded to the steel band during curing. Mold components knock the cured tire out of the top mold member upon opening the mold. The rubber compound is injected into the mold cavity under pressure at the curing temperature of the compound and this temperature is maintained during curing.

41 Claims, 33 Drawing Figures

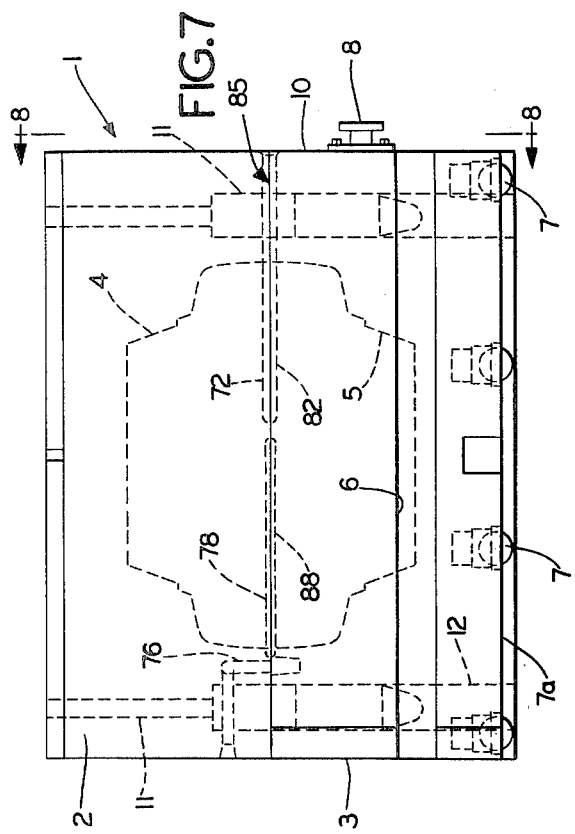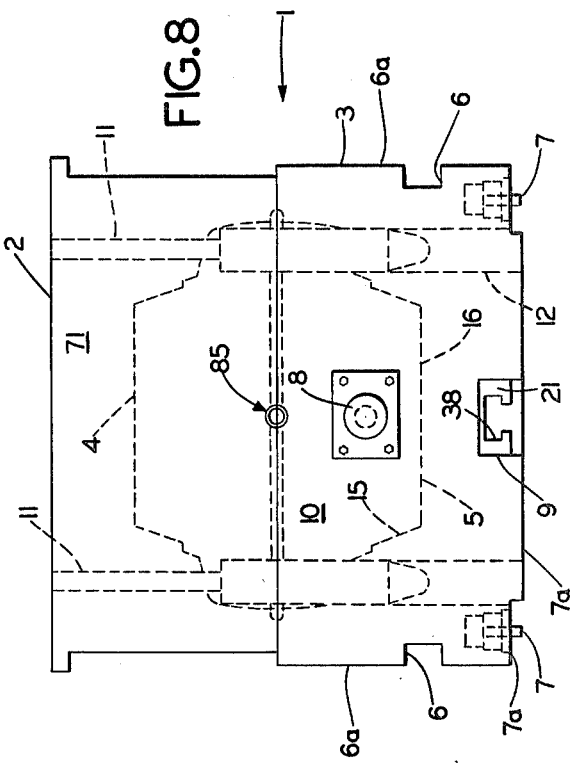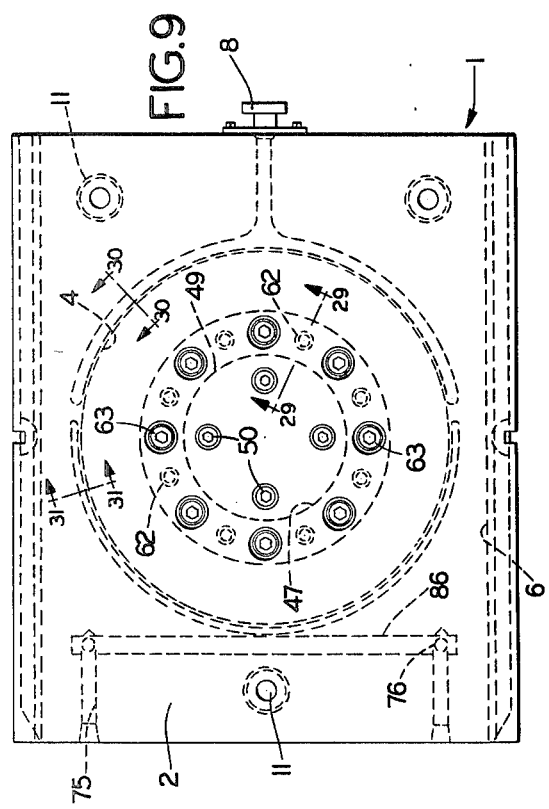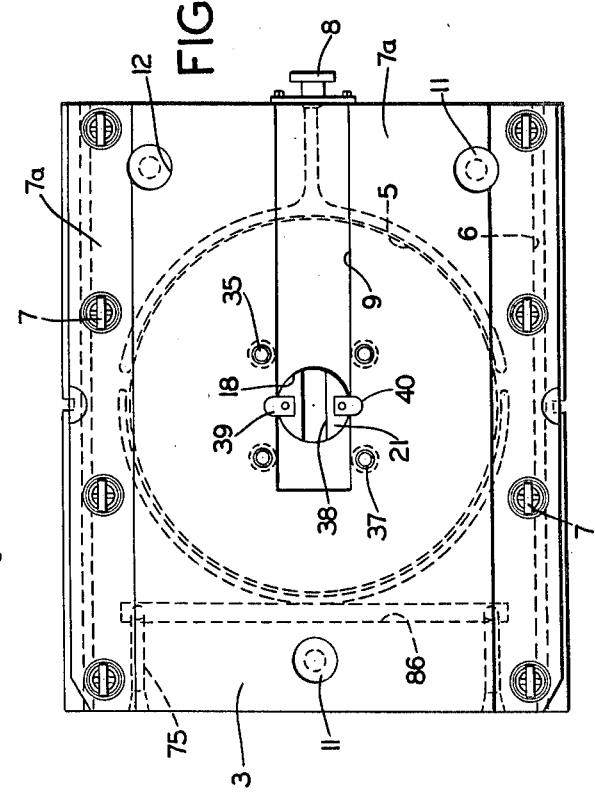

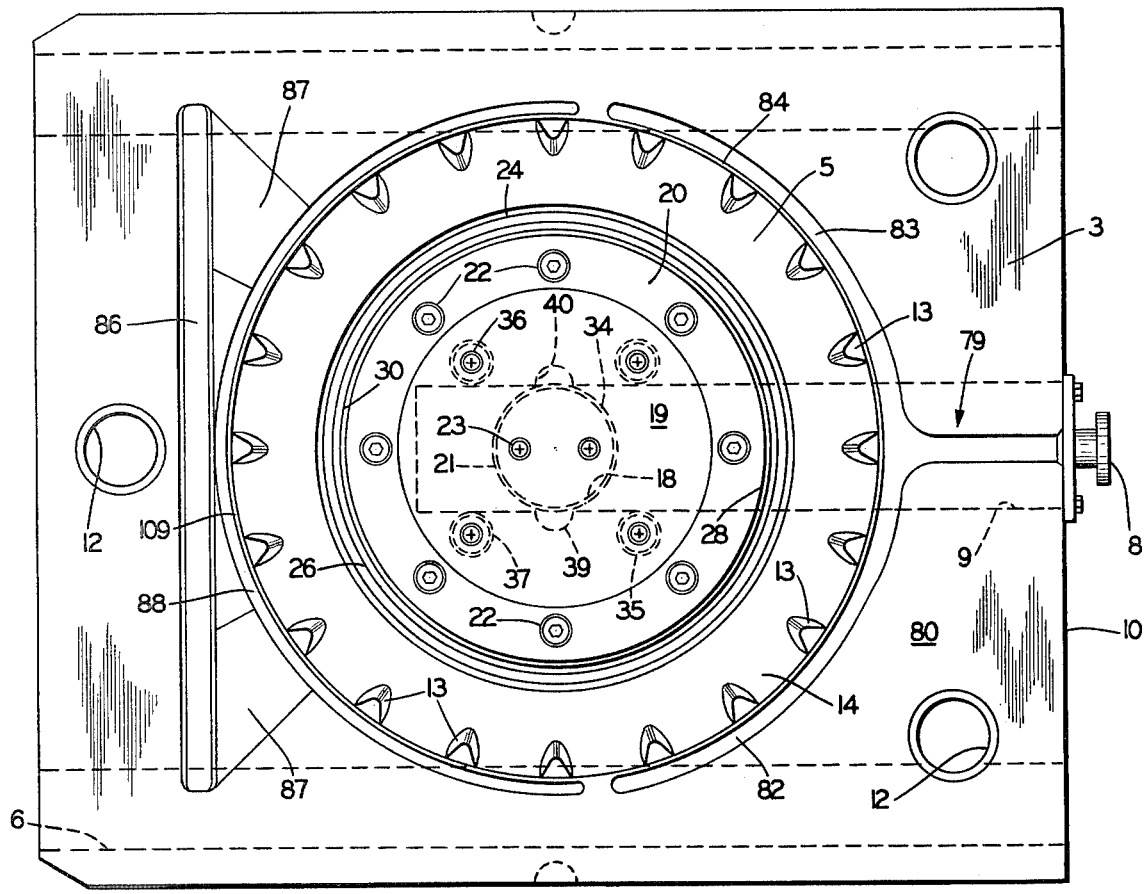
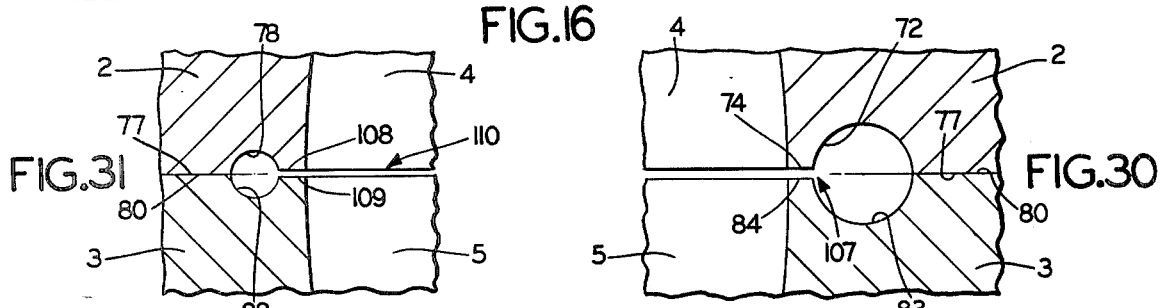
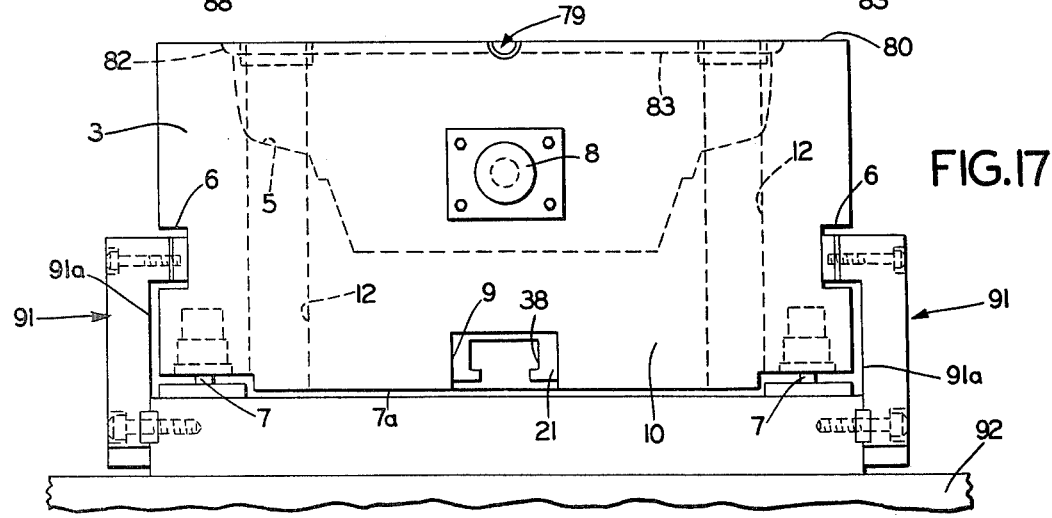

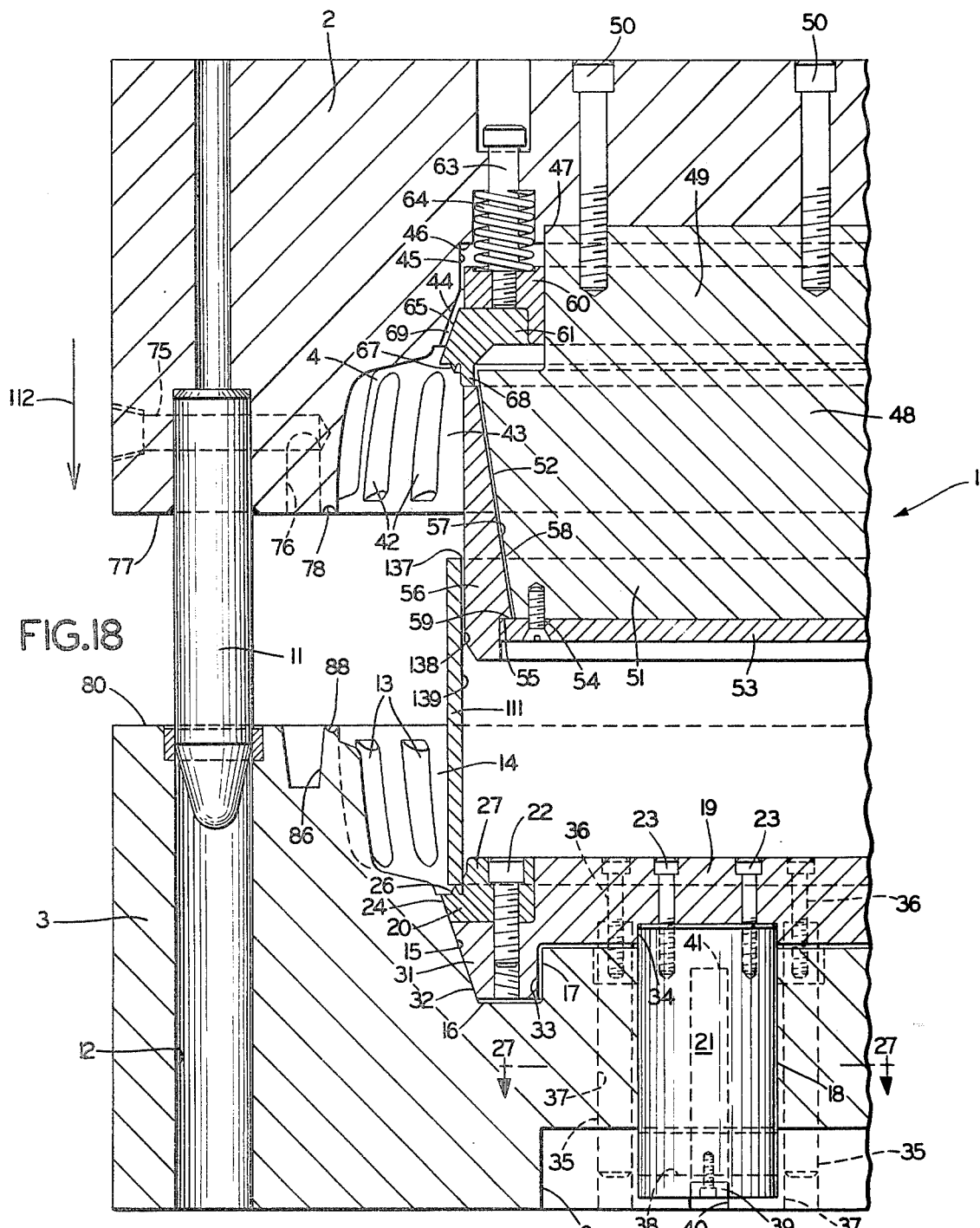
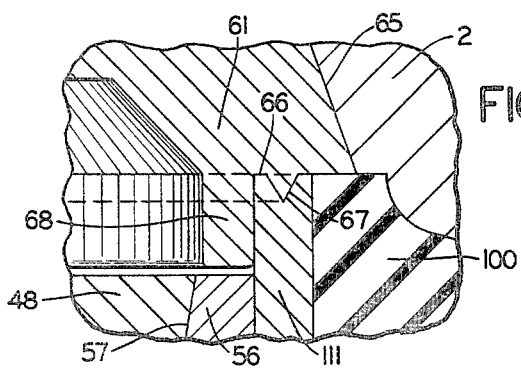
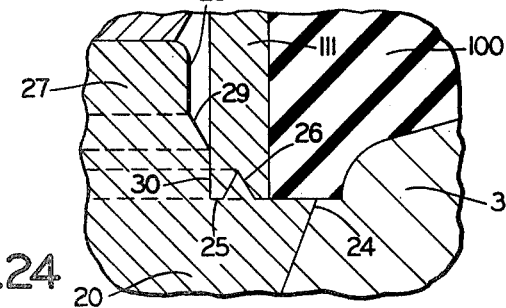

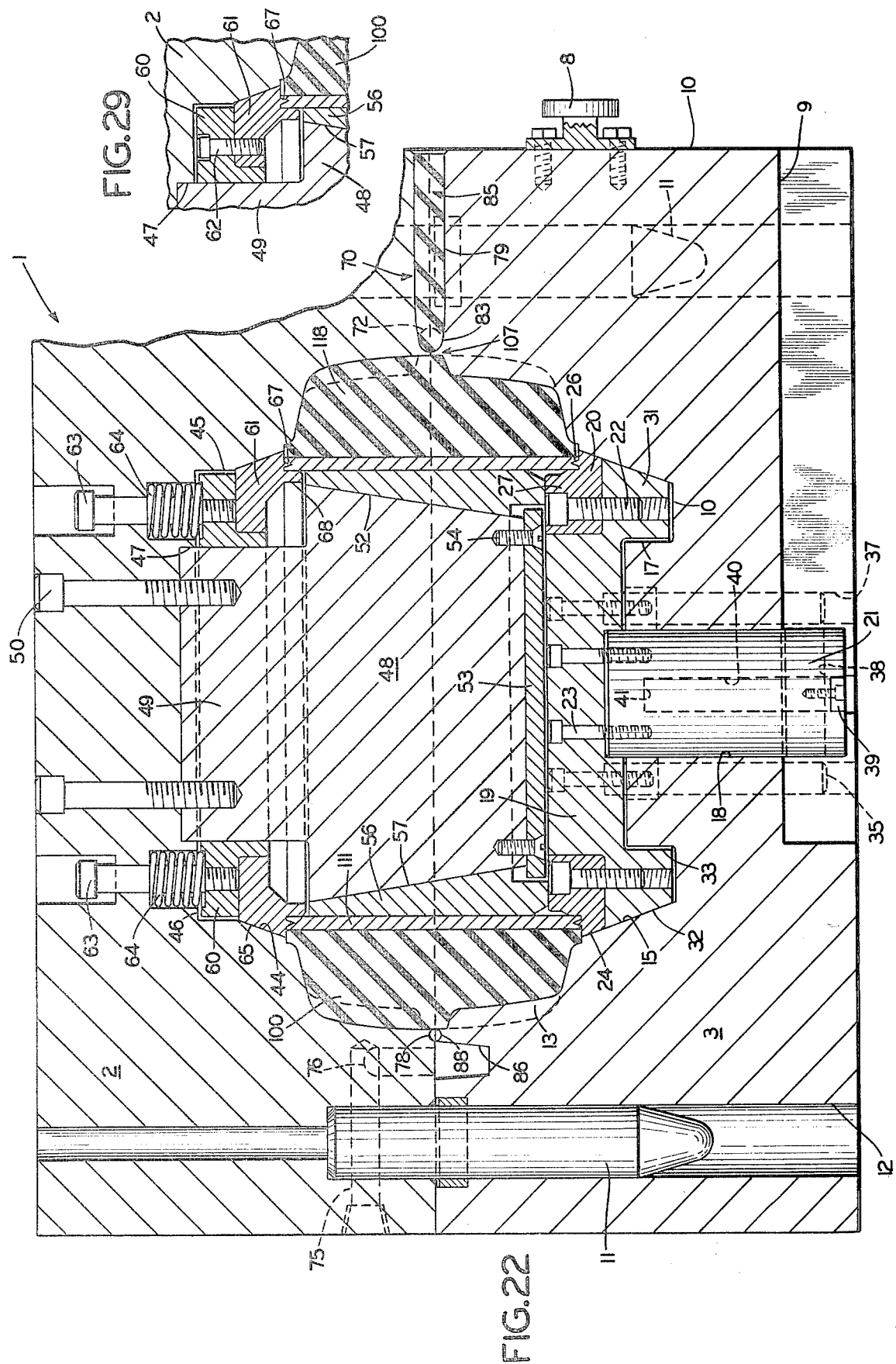

METHOD AND APPARATUS FOR INJECTION MOLDING SOLID STEEL-BANDED PRESS-ON INDUSTRIAL RUBBER TIRES

BACKGROUND OF THE INVENTION

1. Field of the Invention

The invention relates to solid industrial rubber tires and to the manufacture thereof. More particularly, the invention relates to new methods and apparatus for manufacturing such tires using injection molding technology whereby unvulcanized rubber compound is injected into a mold cavity surrounding a steel band to which the rubber is bonded during vulcanizing to form a solid press-on industrial rubber tire. Further, the invention involves new mold constructions and molding procedures which permit vulcanizing the injected rubber compound and bonding thereof to a steel band in an extremely short period of time without steel band distortion from extremely high injection molding pressures required during injection, molding and vulcanizing, which results in finished products having very favorable characteristics.

2. Description of the Prior Art

The manufacture of solid industrial steel-banded rubber tires heretofore has been carried out using compression molding procedures, techniques and equipment. Such compression molding procedures usually have required a two- to three-hour cycle per tire for carrying out molding, vulcanizing and related operations to form a finished product.

These compression molding operations include individually applying to predetermined quantity of unvulcanized rubber compound to and around a steel band, inserting such rubber-compound-surrounded band into an open mold cavity, closing the mold, locating the mold under compression in various known types of heating equipment, and heating the mold to vulcanize the rubber and bond it to the steel band. A relatively large loss of rubber in the flash formed between mold components results in carrying out such compression molding operations. This rubber loss occurs because the predetermined amount of rubber compound applied to and around the steel band before mold cavity insertion must be sufficient to assure by overfill or overflow that the mold cavity is completely filled with rubber when closed and heated under pressure.

Compression molding procedures have been used for the manufacture of bushings consisting of inner and outer spaced metal sleeves or shells with an intervening annular rubber body vulcanized and bonded to and between the metal sleeves such as shown in Lord U.S. Pat. No. 2,187,165. These bushings are molded by axially pressing end caps toward each other to confine the rubber body under pressure during vulcanizing. The end caps engage the ends of the spaced sleeves and also impart compression forces during molding to unvulcanized rubber compound located between the sleeves. Excess rubber overflows from the rubber body between the sleeves into an overflow space. A thick-walled metal pressure tube surrounds a thin outer bushing sleeve during molding to prevent bulging of a thin sleeve from the pressure maintained on the rubber during vulcanization. Such compression molding procedure for the manufacture of such bushings involves many of the same disadvantages described above concerning the compression molding of solid industrial steel-banded rubber tires.

Some of these problems related to compression molding of bushings were sought to be solved by the injection molding of torsion springs or bushings set forth in the Krotz U.S. Pat. No. 2,724,864 wherein the inner and outer metal sleeves or bands have substantial radial thickness and are engaged at their ends by annular sealing projections carried by the upper and lower mold members which bite into the ends of the metal sleeves when the mold is closed to seal the joints thus formed against seepage of rubber compound injected into the space between the sleeves. The filled mold after injection is then transferred and held under pressure between heated plates of a vulcanizing or curing press. However, during injection and vulcanizing there is nothing in Krotz to prevent distortion of the inner sleeve from the pressure developed during injection of the unvulcanized rubber compound into the annular cavity between the inner and outer sleeves. Further, in the Krotz procedure, after the mold has been closed and injected, when it is transferred to the curing press there is nothing to maintain injection pressure on the injected rubber in the space between the sleeves during vulcanization. Thus the Krotz curing step is essentially a compression molding step.

Insofar as we are aware, there have been no solid industrial steel-banded rubber tires produced by complete injection molding procedures before the first production thereof in accordance with the invention. Thus, an injection molded steelbanded industrial rubber tire has been unknown in the art prior to our invention; and there has been a want existing in the art for procedures and equipment by which an injection molded steel-banded industrial rubber tire could be produced with the attendant advantages of injection molding including high quality finished products and short curing times.

SUMMARY OF THE INVENTION

Objectives of the invention include providing a new mold construction which enables the use and advantages of injection molding procedures to manufacture molded steel-banded solid industrial rubber tires; providing such new mold construction in which meeting, mating or parting faces or surfaces of mold plate members and their components, which communicate with the mold cavity portions defined in part by a steel band inserted in the cavity, are held under pressure-sealing relation when the mold is closed to prevent leakage between said sealed faces or surfaces of rubber compound injected under high pressure into the mold cavity; providing such new mold construction in which relatively movable wedge members are expanded internally of the steel tire band to prevent inward distortion of the steel band during injection molding of the steel-banded tire; providing such new mold construction with bite ring components, one of which is biased toward the other and which bite rings are relatively movable with respect to each other during mold closing and opening, and which cooperate with other mold plate member components to achieve the described sealing, and to knock the tire out of the top mold cavity portion during mold opening and to release the expanded wedge member engagement with the interior of the steel tire band during opening of the mold; providing procedures of mold plate member control to achieve the stated advantages; providing mold structures and molding procedures which produce high quality characteristics in steel-banded injection molded solid industrial rubber tires; providing a new steel-banded injection molded solid industrial rubber tire mold construction which incorporates the foregoing objectives in a coordinated, interrelated and cooperative relationship of the described components; and providing such new mold construction which achieves stated objectives in a most efficient and readily operated manner, eliminates difficulties and solves long standing problems and satisfies needs that have existed for many years in the art of manufacture of steel-banded solid industrial rubber tires.

These and other objectives and advantages may be obtained by the new constructions and use procedures of molds for injection molding solid steel-banded industrial rubber tires, the general nature of which may be stated as including mating first and second mold plate members defining with a steel band inserted between the plate members a rubber tread-forming cavity surrounding the band when the plate members are mated under pressure; a hardened steel bite ring located within a recess formed in the first mold plate member adjacent the tread-forming cavity portion therein; the bite ring being movable in its recess and having a conical circumferential surface seated under sealing pressure in a complementary conical portion of the first mold plate member recess when the mold plate members are mated; the bite ring having a V-shaped annular projection wedge seated, by band metal deformation when the plate members are pressure mated, in one end of the steel band insert which defines a portion of said cavity; said bite ring being mounted on a first knockout member movably mounted on the first mold plate; said first knockout member being biased toward the second mold plate member when the mold is closed; the molded steel-banded tire being knocked out by the biased first knockout member from the first plate member cavity portion upon opening the mold; means for injecting rubber compound into and for extracting gases from said cavity; and radially expansible means operative on closing the mold to internally engage a steel band insert and hold it against distortion from high injection pressure during rubber injection and during curing of injected rubber in said cavity.

BRIEF DESCRIPTION OF THE DRAWINGS

Preferred embodiments of molds and steps used for injection molding solid steel-banded press-on industrial rubber tires of the invention—illustrative of the best modes in which applicants have contemplated applying the principles—are set forth in the following description and shown in the drawings and are particularly and distinctly pointed out and set forth in the appended claims.

FIG. 7 is a side elevation of the new top and bottom mold plates closed and removed from a mold carrier;

FIG. 8 is an end view, looking in the direction of the arrows 8—8 of FIG. 7, illustrating the closed mold;

FIG. 9 is a top plan view of the mold shown in FIGS. 7 and 8;

FIG. 10 is a bottom plan view of the mold shown in FIGS. 7 to 9;

FIG. 16 is an enlarged top plan view of the bottom mold plate detached from the mold carrier;

FIG. 17 is an end view of the bottom mold plate located in its transfer guideways on the revolving mold carrier table, looking in the direction of the arrows 17—17, FIG. 11;

FIG. 18 is an enlarged fragmentary sectional view of top and bottom mold plates and related components mounted in a mold carrier and in a partially closed state while being closed after a steel band has been positioned in the mold cavity of the bottom mold plate;

FIG. 22 is a sectional view of the locked mold in the mold-closed position of FIG. 21, after rubber compound has been injected into the mold cavity at the injection station (FIG. 3) of the equipment shown in FIG. 6;

FIG. 23 is an enlarged fragmentary sectional view of the relative position of the components at the top right-hand corner of the mold cavity as shown in FIG. 22;

FIG. 24 is a view similar to FIG. 23 illustrating the relative position of the components at the bottom right-hand corner of the mold cavity as shown in FIG. 22;

FIG. 29 is a fragmentary section taken on the line 29—29, FIG. 9;

FIG. 30 is an enlarged fragmentary section showing the injection gate in the closed mold taken on the line 30—30, FIG. 9;

FIG. 31 is an enlarged fragmentary section showing the vacuum gate in the closed mold taken on the line 31—31, FIG. 9.

Similar numerals refer to similar parts throughout the various figures of the drawings.

DESCRIPTION OF THE PREFERRED EMBODIMENT

Figure 1:
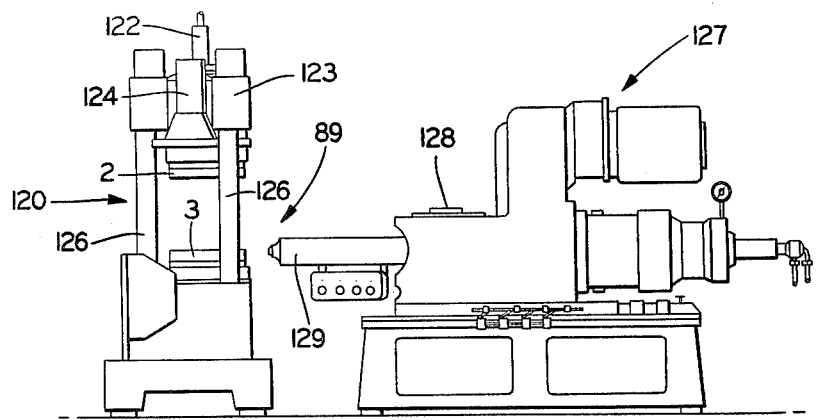
FIG. 1 is a diagrammatic view of the first or injection station of known multi-station rubber injection molding equipment wherein the improved molds are used and the improved molding steps are carried out to mold solid industrial rubber tires, showing a mold carrier in open position.

The new mold construction for injection molding solid steel-banded rubber tires is designed to utilize the many advantageous features of injection molding technology. The new molds indicated generally at 1 are adapted to be used in known multi-station rubber injection molding machines. Such machines may have as many as two to ten or more stations. One type of such machines is an eight station machine sold by Desma-Werke, GMBN., of 2807 Achim Desmastrasse 112, P. O. Box 140, near Bremen, West Germany.

Components of such a molding machine, including an injection unit, a revolving table and mold carriers at each station on the table. For example, eight stations are illustrated diagrammatically in FIGS. 1 through 6. The general construction and operation of such Desma multi-station molding machines forms no part of our invention. It is necessary, however, to refer to such machines in describing the improved mold construction and method of molding carried out with the use of such molds to enable injection molding of solid steel-banded industrial rubber tires.

Accordingly, the construction and use of the new industrial tire molds will be described first, followed by a description of the manner in which the molds are used on multi-station injection molding machines to produce injection molded, steel-banded tires.

The mold 1 (FIGS. 7 through 10) includes a top mold plate member 2 and a bottom mold plate member 3, each of which contains one-half of the mold cavity, the top cavity half being indicated at 4 and the bottom cavity half being indicated at 5, thereby forming a mold cavity 4-5 when the plates are mated and when the mold is closed.

The bottom mold pate 3 is formed with transfer guide slots 6. A plurality of spaced rollers 7 are mounted in the bottom face 7a of the bottom mold plate 3 along each lower corner below the transfer guide slots 6 for a purpose to be described below.

A round T-head 8 is mounted on the front end (right end viewing FIG. 7) of the bottom mold plate 3 for releasable engagement or coupling with a transfer device to be described. A centrally located longitudinally extending slot 9 is formed in the bottom face of the main body of the bottom mold plate (FIG. 10) extending from the front end 10 of the mold plate 3 to beyond the center of the bottom mold plate cavity portion 5.

Three dowels 11 are mounted on the top mold plate 2 and project downward from the top plate 2. When the top plate 2 is in open position above the bottom plate and is moved down as shown in FIG. 18, the dowels are received in dowel openings 12 formed in the bottom mold plate 3 to pilot the top mold plate in proper oriented position for closing the mold plates to form a complete and closed mold.

Referring to FIGS. 16 and 18, the bottom cavity half 5 in the bottom mold plate 3 is provided with projections 13 in the tread-forming portions 14 of the cavity 5, in order to form recesses in the molded tire. The cavity tread portion 14 terminates downwardly inwardly in a conical annular recess surface 15 terminating in a flat annular ringlike surface 16, which surrounds an upstanding central cylindrical pad 17 in which a central axial cylindrical knockout opening 18 is formed.

Other components of the bottom mold plate 3 include a base knockout plate 19, an annular bottom bite ring 20, and a knockout pin 21, which form an assembly by bolting the bite ring 20 with bolts 22 to the knockout plate 19, and by bolting the knockout pin 21 to the knockout plate 19 by bolts 23 (FIG. 18).

The annular bottom bite ring 20 provides important functions and is formed of hardened steel. It has a tapered annular conical wedge surface 24 forming its outer periphery extending upwardly outwardly from its bottom surface, and terminating in a flat annular horizontal shoulder surface 25. A sharp annular projection 26, V-shaped in cross section, projects upwardly from the annular shoulder surface 25 spaced radially outward from the central annular pilot head 27 of the bite ring 20. The pilot head 27 of the bite ring 20 has an upper outer cylindrical wall portion 28, connected by a conical, outwardly downwardly flared or tapered pilot wall portion 29, with an enlarged cylindrical lower wall portion 30. The cylindrical wall 30 extends upward from the shoulder surface 25 (FIG. 24) spaced radially inward of the sharp annular projection 26.

The outer peripheral edge 31 of the knockout plate 19 has a conically downward inward tapered wedge surface 32 which, when the bite ring 20 is assembled, as shown in FIG. 18, with the knockout plate 19, forms a continuation of the conical wedge surface 24 of the bite ring 20. As well as shown in FIGS. 18 to 22, the bite ring 20 is assembled with and fixed to the base knockout plate 19 by bolts 22 in an annular shouldered recess at the top annular corner of the knockout plate 19.

The bottom surface of the knockout plate 19 is formed with an annular recess 33 and a further annular subrecess 34. The annular recess 33 is complementary to and fits over the annular shoulder 17 in bottom mold plate 3, while the upper end of the knockout pin 21 is received in the subrecess 34 when the pin 21 is assembled by bolts 23 with the knockout plate.

When the base knockout plate-bite ring-knockout pin assembly 19-20-21 in turn is assembled with the bottom mold plate 3, the tapered wedge surfaces 24—32 mate in a complementary manner in the conical recess 15 formed in the bottom mold plate 3. During such assembly, the knockout pin 21 is telescoped into the central knockout opening 18 formed in the bottom mold plate 3. Relative movement between the knockout pin 21 and opening 18 may be guided and controlled by four guide pins 35 bolted by bolts 36 to the knockout plate 19 and projecting downward therefrom, spaced from and parallel with the knockout pin 21. These guide pins 35 are telescopically received in guide openings 37 formed in the bottom mold plate 3 (FIGS. 10, 16, 18 and 27).

The knockout pin 21 preferably is formed with a T-slot 38 in its lower end (FIGS. 8, 10, 14, 18 and 22). The T-slot 38 is aligned longitudinally with the center line of slot 9 in the bottom face 7a of the bottom mold plate 3 (FIGS. 8 and 10).

Referring to FIGS. 10 and 18, a pair of stop fingers 39 projecting laterally at right angles to the center line of the T-slot 38 preferably are mounted on the lower end of the knockout pin 21. These fingers are received in vertical guide slots 40 formed in the central opening 18 in the bottom mold plate 3 so as to engage stop shoulders 41 at the upper ends of the guide slots 40 to limit upward movement of the knockout pin 21 in central knockout opening 18.

Figure 15:
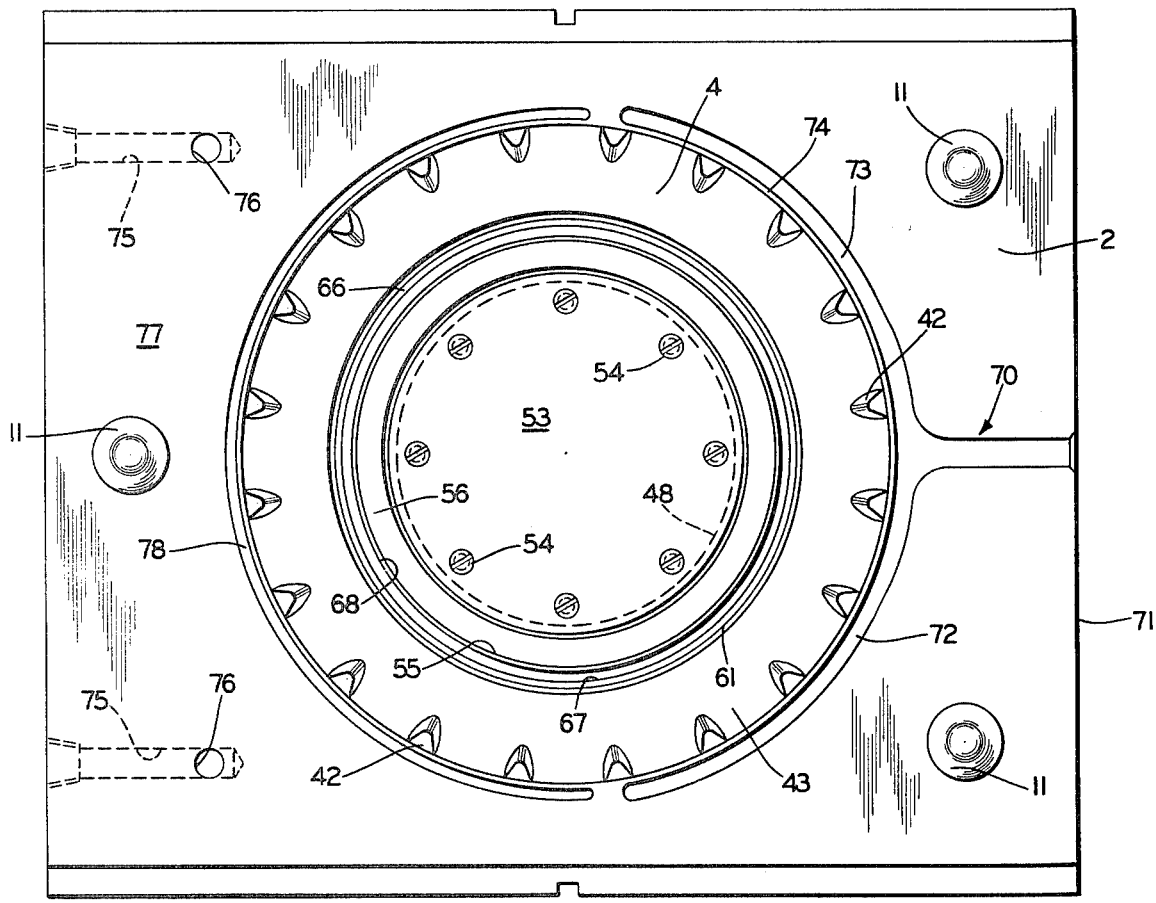
FIG. 15 is an enlarged bottom plan view of the top mold plate detached from the mold carrier.

Referring to FIGS. 15 and 18, the top cavity half 4 in the top mold plate 2 is provided with projections 42 in the tread-forming portion 43 of the cavity 4, in order to form recesses in the molded tire similar to those formed by the projections 13 in the bottom mold plate 3. The cavity tread portion 43 terminates upwardly inwardly in a conical annular recess surface 44 terminating in a cylindrical surface 45 extending from a flat horizontal surface 46 having an upwardly recessed socket 47 therein.

A wedge member 48 has its cylindrical shank 49 seated in the recessed socket 47 and bolted by bolts 50 to the top mold plate 2. The wedge member 48 has an enlarged wedge head 51 extending downward from the shank 49. Wedge head 51 is formed with an annular concial downwardly and inwardly extending wedge surface 52. A plate 53 is bolted at 54 to the lower end of the wedge head 51 having its outer peripheral edge projected radially outward of the lower end of conical surface 52 to form a shoulder 55 at the lower end of the wedge head.

The wedge head 51 is surrounded by a tapered split ring 56 having an inner conical surface 57 complementary to the conical surface 52 of the wedge head. Normally, the split wedge ring 56 has a slight clearance between its conical surface 57 and the conical surface 52 of the wedge head 51, as indicated at 58 in FIG. 18. The split ring 56 is supported on the wedge member 48 by engagement of its shoulder 59 with the shoulder 55 formed by the plate 53.

Other components of the top plate 2 include a top knockout ring 60 having a top ring 61 assembled thereto bybolts 62 (FIGS. 9 and 29). The top knockout ring 60 is supported by bolts 63 on the top mold plate 2 and is slidably, axially mounted on the cylindrical shank 49 of the wedge member 48. The top plate 60-bite ring 61 assembly is spring pressed downward, viewing FIG. 18, by spring 64.

The top bite ring 61, like the bottom bite ring 20, provides important functions and also is formed of hardened steel. It has a tapered annular conical outer wedge surface 65 forming its outer periphery, extending downwardly outwardly to its bottom surface where it terminates in a flat annular horizontal shoulder surface 66. A sharp annular projection 67, V-shaped in cross section, projects downwardly from the annular shoulder surface 66 (FIG. 23). An annular projecting pilot portion 68 projects downwardly from the shoulder surface 66 of the top bite ring 61 spaced radially inwardly from the sharp annular projection 67 on the bite ring.

As shown in FIG. 18, the springs 64 normally press the top knockout ring 60 downward. Thus, the bite ring 61 is pressed downwardly and engages the top annular edge of split ring member 56 foreing the ring 56 downward so that its shoulder 59 engages and is supported by the shoulder 55 formed by bottom plate 53 on wedge member 48, thereby establishing the clearance 58 described above between split ring 56 and wedge head 51.

In this state, the top knockout ring 60 has been moved downward along and with respect to the cylindrical shank 49 of wedge member 48. There also thus is provided a clearance space, as shown in FIG. 18, between the complementary conical wedge surface 44 formed in the top mold cavity and the conical wedge surface 65 on the top bite ring 61. This clearance is illustrated at 69 in FIG. 18. During this spring biased movement of the bite ring 61 its pilot portion 68 must clear the upper corner of the wedge head 51 formed by its conical surface 52.

The top and bottom mold plates 2 and 3 each are provided with sprue, runner and gate formations which when the top and bottom mold plates 2 and 3 are closed, as in FIGS. 7 to 10 and 22, form the sprue, runners and gate through which rubber compund is injected into the mold cavity 4-5.

These formations are best shown in FIGS. 15 and 16. The sprue formation in the top mold plate 2 is indicated generally at 70 and extends from the front end 71 of the top mold plate 2 toward the top cavity half 4 where it branches into runner formations 72 and 73 which extend in each direction a desired distance such as up to approximately 90° circumferentially around the open end of the tread portion 43 of the top cavity 4. A gate forming portion 74, described further below, communicates between the runners 72 and 73 and the top cavity half 4.

Passages 75 are formed in the back portion of the top mold plate 2 for connection with a source of vacuum, and the passages 74 each communicates with one of a pair of branch passages 76 which extend from the inner ends of passages 75 to the parting face 77 of the top mold plate 2. A substantially semicircular vacuum runner and overflow formation 78 also is formed in the parting face 77 of the top mold plate 2 having gate communication with the top cavity half 4 of the top mold plate 2, described further below (FIG. 15). If for some reason the mold when injected is overfilled with rubber compound the formation 78 acts as an overflow receptacle.

Similarly, the bottom mold plate 3 has a sprue formation 79 formed in the parting face 80 extending from the front end 10 of the bottom mold plate 3 toward the bottom cavity half 5 of bottom mold plate 3 where it branches into runner formations 82 and 83 extending circumferentially a desired distance in each direction from the sprue formation 79. These runner formations 82 and 83 also communicate at the open end of bottom mold cavity half 5 by gate forming portions 83 (FIG. 16).

When the top and bottom mold plates 2 and 3 are in closed position as shown in FIGS. 7 through 10, the opposed sprue, runner and gate formations in each, which are complementary, complete the formation of a sprue and runners and a gate for the mold cavity 4-5. The completed sprue connection is best indicated generally in FIG. 8 at 85.

An elongated vacuum chamber formation 86 is formed in the parting face 80 of bottom mold plate 3 adjacent the rear of the bottom cavity half 5 (FIG. 16) which communicates at each end with the branch vacuum passages 76 in the top mold plate 2 when the mold plates are in closed position with their parting faces 77 and 80 in contact locked under pressure. Runner formations 87 extend from each end of the vacuum chamber 86 to the semicircular vacuum and overflow runner portion 88 formed in the parting face 80 of the bottom mold plate 3. Thus, when the top and bottom mold plates 2 and 3 are in locked, closed position, vacuum can be imposed by connections with a vacuum source of vacuum passages 75 to draw gases through the vacuum passages 75 and 76, the vacuum chamber 86 and the vacuum runners 78, 87 and 88 from the closed mold cavity to enable complete filling of the mold cavity with rubber compound injected into the mold.

Figure 6:
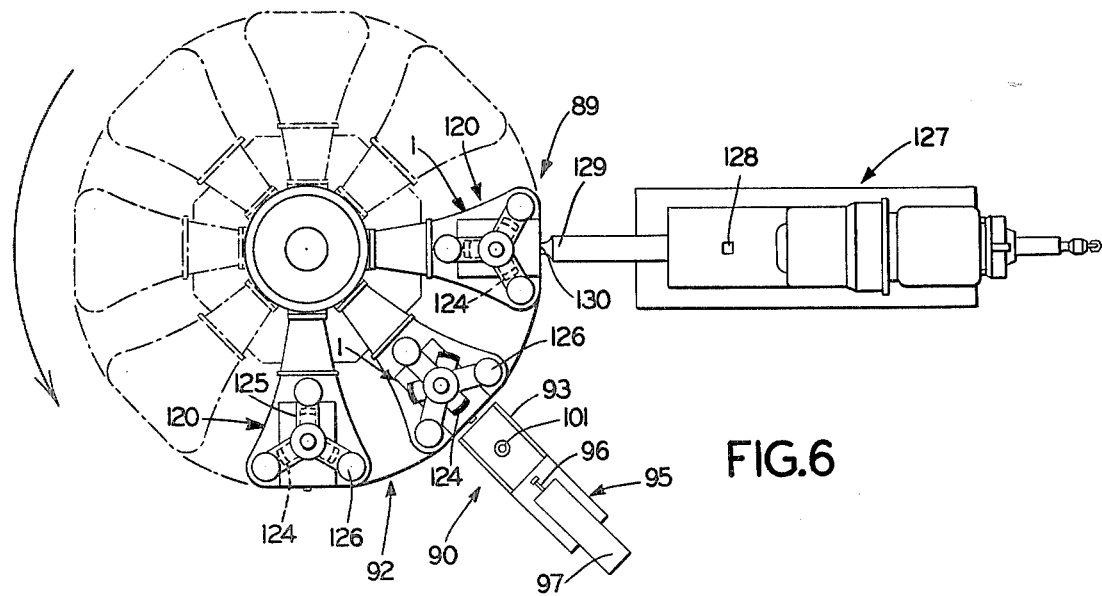
FIG. 6 is a diagrammatic top plan view of known multi-station rubber injection equipment including the injection and demolding stations of FIGS. 1 and 4.

The complete operation of injection molding solid steel-banded press-on industrial rubber tires described below, using multi-station rubber injection molding equipment having eight stations, accomodates eight separate closed molds 2-3, one located at each of the eight stations, as illustrated in FIG. 6. The first or injection station and the eighth or demolding station are indicated generally at 89 and 90, respectively, in FIGS. 1-6. A different tire size may be made in each of the eight molds; or if production of one tire size should exceed other sizes, two of the molds may be the same. In each case the cycle of operation passes any one mold from the injection station 89 to the demolding station 90.

The use of any mold 2-3 does not require operation of an 8-station, multi-station injection installation since injection molding can be carried out with the improved mold construction in a 2-station, multi-station injection molding installation where the mold moves from an initial injection station to a final demolding station using the same molding time cycle that would be used when molding is carried out on an 8-station installation where the time cycle is related to the time of movement from the injection station to the demolding station.

A particular injected mold 2-3 upon arrival at the demolding station 90, is opened. Then the bottom mold plate 3 with a molded tire therein is removed from the mold carrier and is transferred to a mold knockout table where the tire is removed. Some of these operations and mechanisms used are illustrated somewhat diagrammatically in FIGS. 11, 12 and 13 as well as in FIGS. 4 and 6.

Figure 11:
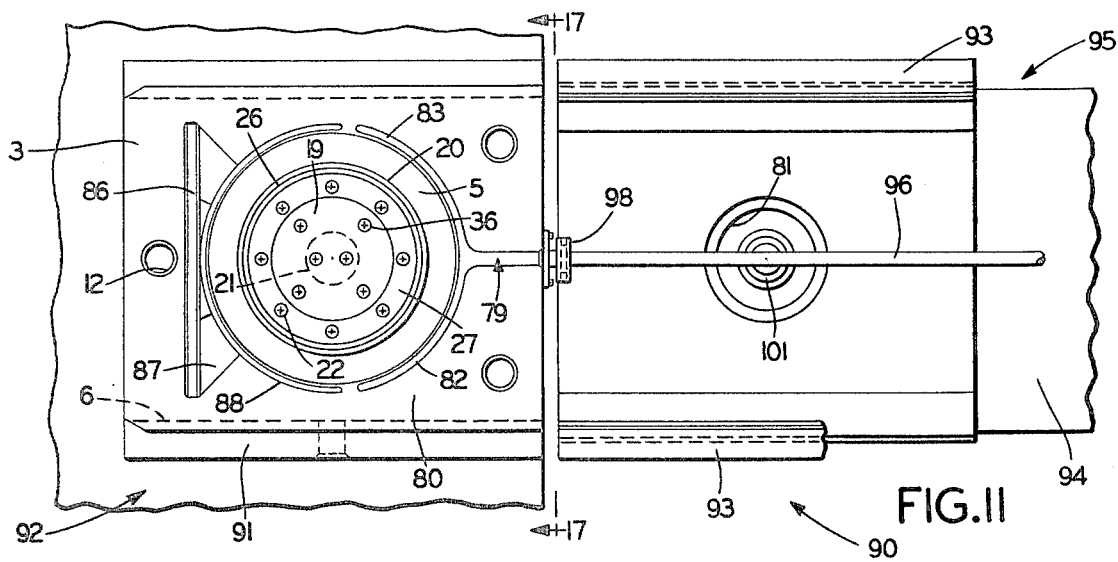
FIG. 11 is a somewhat diagrammatic view with a molded tire omitted, looking down on a bottom mold plate resting on a revolving mold carrier table at the demolding station shown in FIG. 6, the bottom mold plate being in position to be transferred from the revolving table to the mold service table.

For convenience in description, the bottom mold plate 3 in FIG. 11 is illustrated at the demolding station 90, with the tire removed and the mold plate 3 positioned on a transfer guideway 91 which is mounted on the revolving mold carrier table 92 of the multi-station injection molding equipment. Such bottom mold plate 3 location on revolving table 92 also is illustrated in FIG. 17.

The mold carrier transfer guideway 91 at this stage in the molding cycle is aligned with the transfer guideway 93 mounted on the top plate 94 of the mold knockout or service table 95. Meanwhile a transfer rod or drawbar 96 extending from a hydraulic cylinder 97 located at the demolding station (FIG. 6) 90 has been positioned as shown in FIG. 11 with its T-slot 98 adjacent the revolving table 92 oriented to receive the T-head 8 of mold plate 3 when said mold plate 3 on the table 92 is moved to and arrives at the demolding station 90. In this manner the transfer drawbar 96 is coupled with the bottom mold plate 3 at the demolding station. Transfer guideway members 91 and 93 have respective laterally spaced channel-shaped means 91a and 93a (FIGS. 14 and 17) which engage guide slots 6 in laterally spaced sides 6a (FIG. 8) of mold plate 3 during transfer.

The transfer drawbar 96 then is moved by cylinder 97 in the direction of the arrow 99 (FIG. 12) to transfer the bottom mold plate 3 from revolving table guideway 91 to knockout table guideway 93. The bottom mold plate 3, during such movement, rolls on the rollers 7 shown in FIGS. 7 and 8. A molded tire 100 is illustrated in the bottom mold plate 3 in FIG. 12 as the mold plate 3 is being transferred to the knockout table 95.

Figure 13:
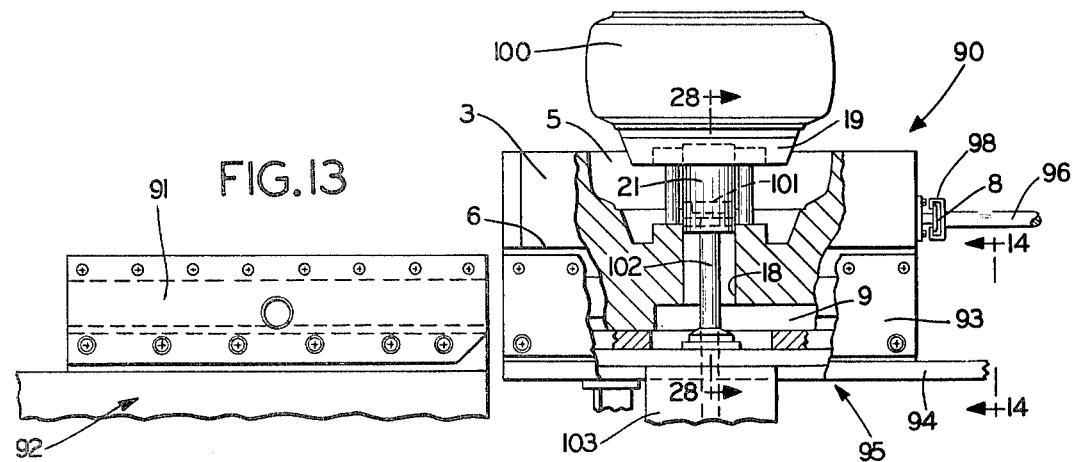
FIG. 13 is a diagrammatic view similar to FIG. 12, showing the bottom mold plate located on the mold service table, and the molded tire knocked out of the mold.
Figure 14:
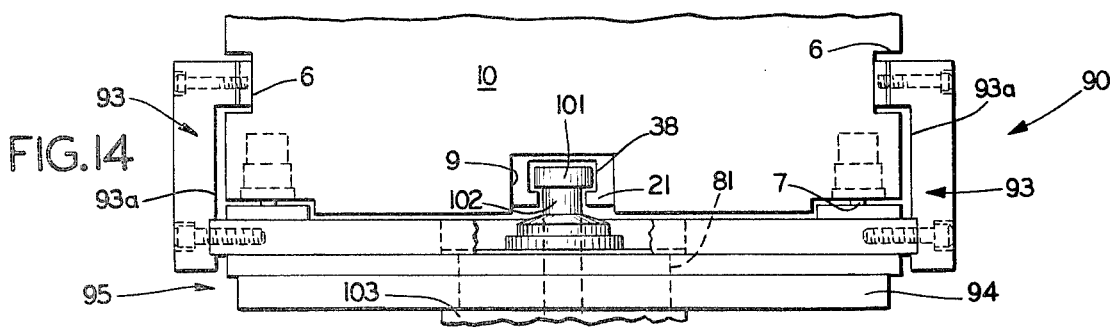
FIG. 14 is a fragmentary and elevation of the bottom mold plate located in its transfer guideways on the service table looking in the direction of arrows 14—14, FIG. 13.
Figure 27:
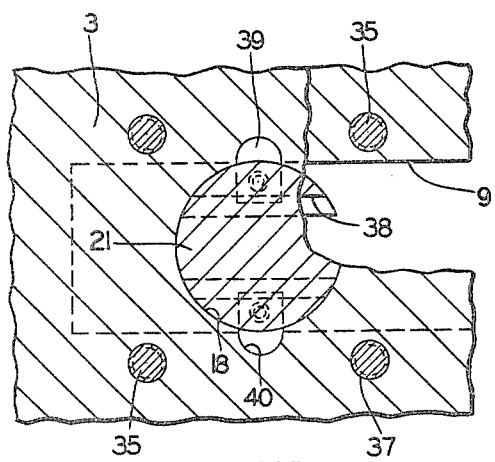
FIG. 27 is a fragmentary horizontal sectional view of the knockout pin in the bottom mold plate taken on the line 27—27, FIG. 18.
Figure 28:
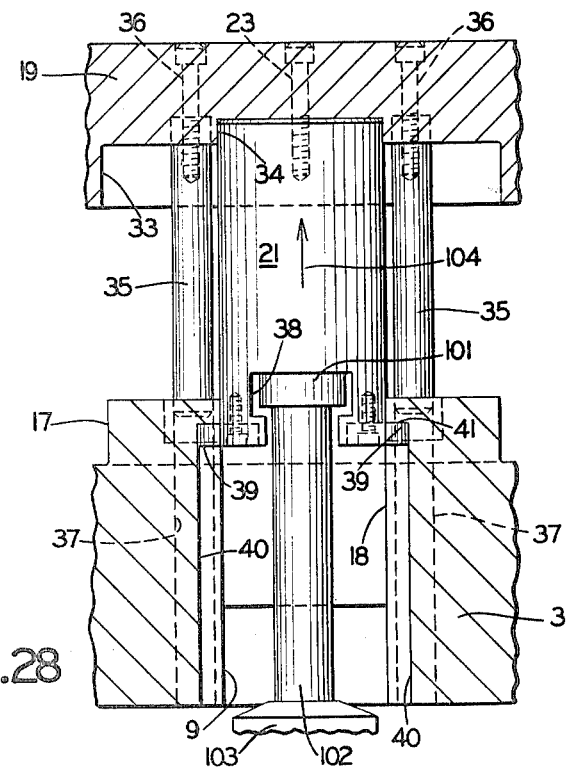
FIG. 28 is a vertical sectional view looking in the direction of the arrows 28—28, FIG. 13, showing a molded and cured tire removed from the cavity portion of the bottom mold plate at the demolding station.

Referring to FIGS. 10, 13, 14, 22, 27 and 28, the central slot 9 in the bottom face of bottom mold plate 3 has an important function. The lower end of knockout pin 21 extends into the slot 9 as shown in FIGS. 14, 18 and 27. The T-slot 38 in the lower end of knockout pin 21, as previously indicated, is aligned longitudinally with the center line of bottom plate slot 9 so that as the bottom mold plate 3 is moved from the position of FIG. 11 to the position of FIG. 13 a T-head 101 at the top of knockout ram 102, on arrival of the bottom mold plate 3 at a predetermined position on the knockout table 95, engages said knockout pin T-slot 38 as shown in FIG. 14, which illustrates the bottom mold plate 3 upon arrival at said predetermined location on knockout table 95.

The bottom mold plate 3 when at said predetermined position has the axis of the knockout pin 21 aligned with an opening 81 in the top plate 94 of knockout table 95 (FIG. 11). The opening 81 provides a passage through which the knockout ram may extend to locate its T-head 101 in position to be coupled with the T-slot 38 at the lower end of knockout pin 21, when the bottom mold plate 3 is moved onto the knockout table 95.

The knockout ram 102 is actuated by a hydraulic cylinder 103 (FIG. 28) to move the knockout pin 21 upward in the directin of the arrow 104. The knockout pin 21, as previously described, is mounted on the base knockout plate 19 and during upward movement of the knockout ram 102 and knockout pin 21 the bottom mold knockout plate 19 is dislodged from its position in the bottom cavity half 5 of the bottom mold plate 3 carrying the molded tire 100 with it to the knocked out position as illustrated in FIG. 13. At this location the molded tire may be removed by handling equipment (not shown) to a trimming and inspection station.

Referring to FIGS. 9, 15, 16, 22, 30 and 31, the views in FIGS. 9, 15, 16 and 22 are on too small scales to show the nature and character of gates formed between the injection runner formations and the mold cavity and between the vacuum runner formations and the mold cavity. These gates, however, are shown somewhat diagrammatically by larger scale fragmentary views of FIGS. 30 and 31.

In FIG. 30, the top and bottom mold plates 2 and 3 are shown closed with locked contact between their respective parting faces 77 and 80. Also shown is the registry between a top plate runner 72 and a bottom plate runner 83. The closed or complete runner 72-83, as shown, is spaced a slight distance from the top and bottom cavity halves 4 and 5 respectively. This space is defined by the mold cavity forming wall portions 74 and 84 which define the injection gate between the injection runners and the mold cavity.

This injection gate is indicated generally at 107, and in FIG. 30 the parting line between the top and bottom mold plates 2 and 3 is omitted for clarity where it runs through the injection gate 107. The clearance between wall portions 74 and 84, defining the injection gate 107, is very slight, being of the order of thousandths of an inch.

The injection gate spacing between wall portions 74 and 84, which may be said to be the gate thickness or clearance, may be varied, along with the length of the gate wall portions 74 and 84 between the runner and die cavity to ensure sufficient final heating of the rubber compound by friction developed during injection through the gate so that the temperature of the rubber in the mold cavity as filled is at the required curing temperature for the particular rubber compound involved. Thus, the injection velocity, and the width and length of the gate 107 determine the amount of shear heating of the injected uncured rubber compound which takes place, as well as the compound composition. For these reasons, in the injection molding of different tires, the gate clearance may be in the range of 0.020 inches to 0.060 inches thick.

Referring to FIG. 31, the top and bottom mold plates 2 and 3 are shown closed with locked contact between their respective parting faces 77 and 80. Also shown is the registry between the top plate vacuum runner 78 and the bottom plate vacuum runner 88. The closed vacuum runner 78-88, as shown, is spaced a slight distance from the top and bottom cavity halves 4 and 5 respectively. This space is defined by the mold cavity forming wall portions 108 and 109 which form the vacuum gate 110 between the vacuum runner and the mold cavity. The vacuum gate if formed by even less clearance than the clearance which forms the injection gate 107. In FIG. 31, the parting line between the top and bottom mold plates 2 and 3 is omitted for clarity where it runs through the vacuum gate 110.

One of the critical concepts of the invention involves the coordination and interrelation between and the particular constructions of the top and bottom mold plates 2 and 3 as well as of components assembled to and functioning as a part of the two mold plates. These features are described below, referring to FIGS. 18, 19, 20, 21, 23 and 24, first in connection with closing the mold plates 2 and 3 to form a closed mold ready to be injected with rubber compound. The coordination and interrelation between the components then are described, referring to FIGS. 22, 23, 24, 25 and 26, in connection with injection of the mold, molding and opening the mold after a solid steel-banded industrial rubber tire has been cured therein.

A solid steel band or rim to which the solid rubber tread is bonded during molding and curing is indicated at 111. The steel in this band is softer than the hardened steel from which the respective top and bottom bite rings 61 and 20 are formed. A steel band 111, when the mold is completely open, is inserted into bottom cavity half 5 of bottom mold plate 3 (FIG. 18). At this time the mold plates 2 and 3 are separated vertically a much greater distance than shown in FIG. 18. During placement of the band 111 in the bottom mold cavity, the conically flared portion 29 (FIG. 24) of bottom bite ring 20 pilots the band 111 to axially align it with the vertical center line of the bottom cavity half of bottom mold plate 3. Flared portion 29 directs the band 111 to a position surrounding the cylindrical wall portion 30 of the bite ring 20.

The top mold plate 2 then is moved downward in the closing direction of movement indicated by the arrow 112 in FIG. 18 so that the dowels 11 enter the dowel openings 12 of the bottom mold plate 3 as shown in FIG. 18 to assure proper registry or mating of the mold plates 2 and 3. At this stage of mold closing movement, the wedge member 48 and related components of the top mold plate 2 assembled to the latter have the relative positions and relationship shown in FIG. 18, and wedge head 51 and split wedge ring 56 have just started to enter the interior of the steel band 111.

Figure 19:
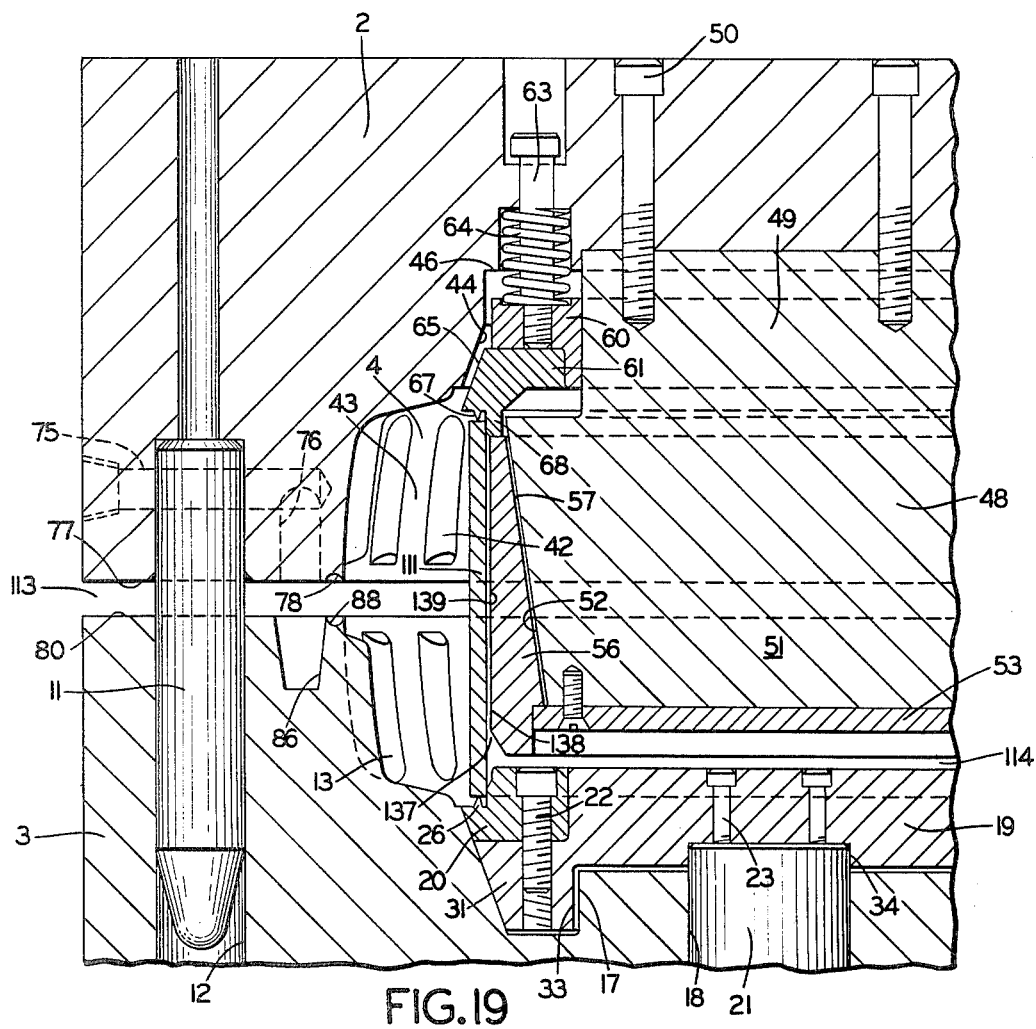
FIG. 19 is a fragmentary view similar to FIG. 18, showing the position of the mold components after further closing movement of the top mold plate toward closed position.

During continued downward closing movement of the top mold plate 2 toward the bottom mold plate 3, the parts reach the position shown in FIG. 19. At this time, the annular pilot portion 68 (FIG. 23) enters the upper open end of the steel band 111 to establish and maintain relative concentricity between the top and bottom mold plates, the mold cavities therein, and the steel band 111. The closing pressure imparted to the top mold plate 2 causes the sharp annular V-shaped projection 67 on the top bite ring 61 to engage the upper annular edge of the steel band 111. Meanwhile the sharp annular V-shaped projection 26 of the bottom bite ring 20 engages the lower annular edge of the steel band 111 as shown in FIG. 19.

At this time, there is a space such as indicated at 113 in FIG. 19 between the top and bottom mold plates 2 and 3. Also there is clearance indicated at 114 between the top surface of base knockout plate 19 and the bottom edge of split wedge ring 56. There is also clearance at this time between the top knockout ring 60 and the flat wall 46 of the cylindrical recess 45 in the top mold plate 2. Clearance also is present between the top bite ring 61 and the conical mold surface 44, as shown in FIG. 19.

Figure 20:
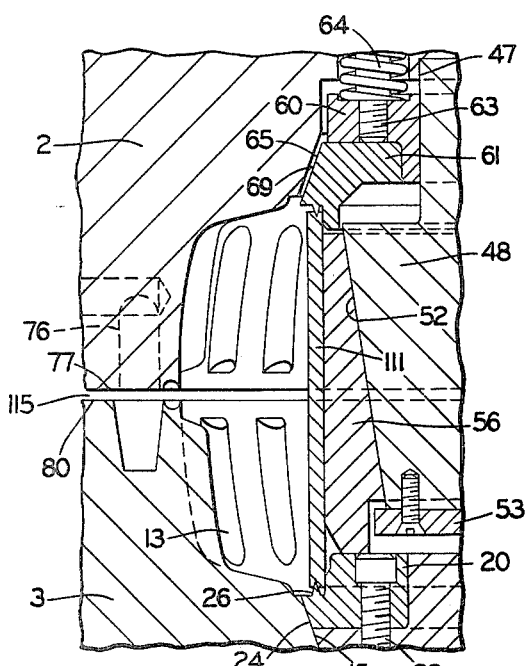
FIG. 20 is a fragmentary view similar to a portion of FIG. 19, showing the top mold plate nearly closed with respect to the bottom mold plate.

As the top mold plate 2 is closed further toward the bottom mold plate 3 as shown in FIG. 20, the wedge head 51 of wedge member 48 expands the split wedge ring 56 so that the outer surface 138 engages the interior cylindrical surface 139 of the steel band 111. Meanwhile the springs 64 are compressed permitting cavity portions of the top mold plate 2 to approach portions of the top knockout ring 60 and related components as shown in FIG. 20. At this stage in die plate closing, there is still a closing space 115 between the parting faces 77 and 80 of top and bottom mold plates 2 and 3.

Figure 21:
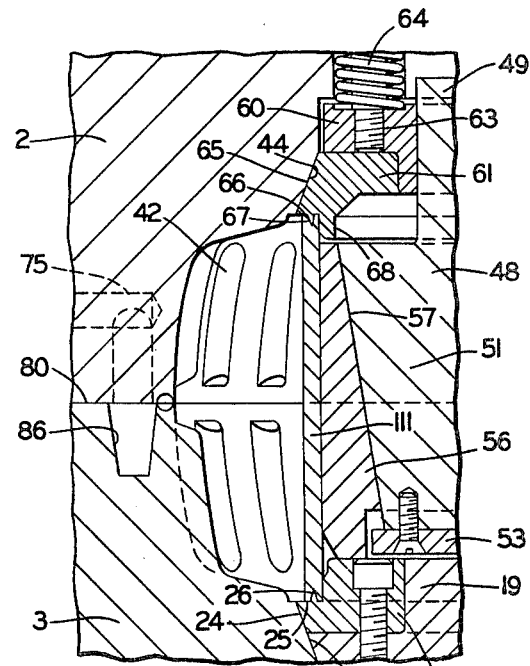
FIG. 21 is a view similar to FIG. 20 showing the mold plates completely closed, and as locked in a mold carrier at the injection station (FIG. 3) of the multi-station unit illustrated in FIG. 6.

Complete closing of the top and bottom mold plates 2 and 3 is shown in FIG. 21, with the respective parting faces of the plates in pressure contact and registry of mold cavity formations, etc., established. During this final closing movement from the position of the parts shown in FIG. 20 to that of FIG. 21, the V-shaped sharp annular projections or ribs 67 and 26 are forced into and wedge seated in the softer metal of the top and bottom annular edges of the steel band 111 as shown in FIG. 21. The forced entry of the hardened steel V- shaped ribs into the metal of the top and bottom steel band edges displaces and deforms the band metal and seats the top and bottom annular edges of the steel band against the shoulder surface 66 of top bite ring 61 and against the shoulder surface 25 of the bottom bite ring 20 to provide seals between the top and bottom edges of the steel band 111 and the respective bite rings 61 and 20.

Meanwhile, the wedge head 51 continues its expanding pressure against the split ring 56 to rigidly support the cylindrical steel band 111 against distortion particularly inward distortion during later injection of the mold cavity with rubber compound. As shown in FIG. 21, the lower edge of split wedge ring 56 is pressed downward by the expanding force of wedge member 48, into pressure contact with the annular cylindrical wall portion 28 of bottom bite ring 20. Furthermore, the conical wedge surface 24 of bottom bite ring 20 is seated under pressure in wedge sealing contact with the conical recess 15 of the bottom mold plate 3, while the conical wedge surface 65 of top bite ring 61 is wedge seated in sealing contact under pressure against the conical recess 44 of the top mold plate 2.

The completely closed and sealed mold, as just described, is locked in the closed position shown in FIGS. 21 and 22 and molding pressure applied to the closed and locked mold plates 2 and 3 during operation of multi-stage molding equipment described more in detail below.

FIG 22 generally illustrates the closed mold, after injection of rubber compound into the mold cavity and after the tire has been cured therein, and when the mold is ready to be opened at a demolding station 90. In this state, the top and bottom mold plates 2 and 3 and their components have the same relative relationship as is shown in FIG. 21 prior to rubber compound injection.

Figure 25:
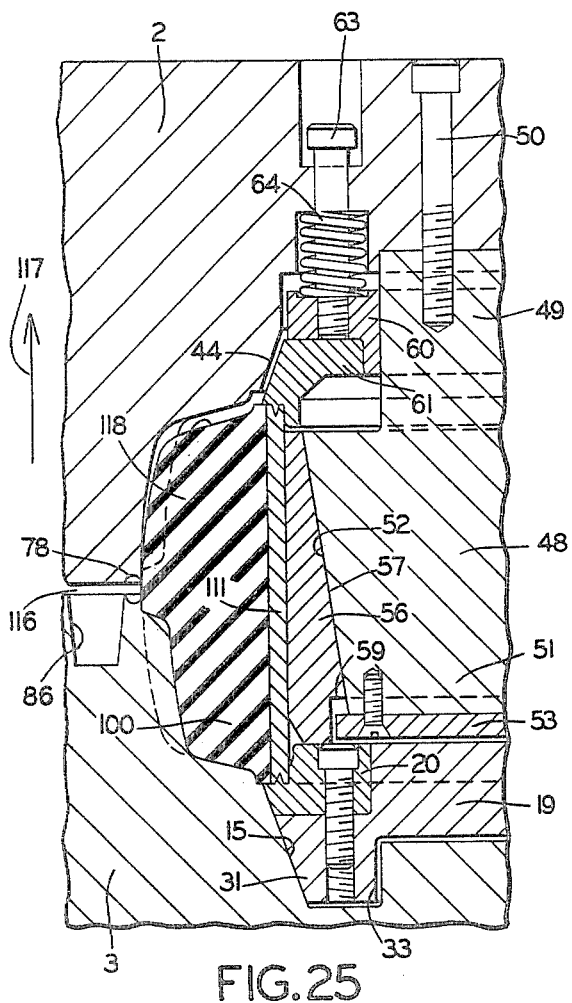
FIG. 25 is a fragmentary sectional view similar to a portion of FIG. 22 after the molded tire has been cured and separation of the top mold plate by upward movement thereof has just commenced which releases the tire from the portion of the mold cavity in the top mold plate.

Initial separation of the top and bottom mold plates 2 and 3 is indicated in FIG. 25 by the small separating space 116 illustrated between the mold plates. This separation and related movement of components occur when the mold is opened during demolding. The molded tire 100 remains in the bottom cavity half 5 as the top mold plate 2 is raised a short distance, in the direction of the arrow 117, from the bottom mold plate 3.

During this opening movement of the top mold plate 2, springs 64 force the top knockout plate 60 downward, releasing it from wedge seating in the top plate conical recess 44. At the same time the upper half of the molded and cured tire tread portion 118 is released from the top cavity half of the top mold plate 2 (FIG. 25).

As the top mold plate 2 continues its opening movement in the direction of the arrow 117 (FIG. 26) to increase the mold plate separation as indicated at 119, the wedge head 51 of the wedge member 48 moves up relative to the split wedge ring 56 releasing its wedge pressure against the split ring 56. This relative movement occurs because the pilot portion 68 of the top bite ring 61 engages and holds the split ring 56 against movement due to the downward pressure of springs 64. Thus the split ring 56 is dislodged from wedge engagement between its conical surface 57 and the conical surface 52 of the wedge head 51, thereby reestablishing the clearance 58 therebetween. At this time, the split wedge ring 56 drops and is supported on the shoulder 55 of the plate 53 on the wedge member 48.

Figure 26:
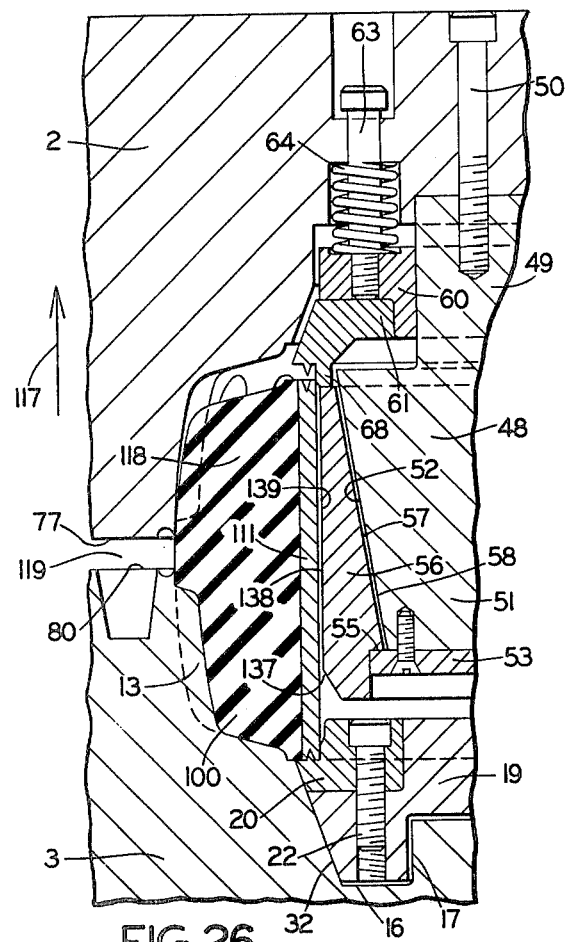
FIG. 26 is a view similar to FIG. 25 after further opening of the mold during further upward movement of the top mold plate, showing release of mold components from expanded radial clamping engagement with the cylindrical interior of the bonded steel band of the tire.

In FIGS. 18, 19 and 26, a clearance space 58 is shown between the tapered wedge head surface 52 and the tapered split ring surface 57. Also, a clearance space 137 is indicated between the outer cylindrical surface 138 of split ring 56 and the inner cylindrical surface 139 of the band 111. These clearances 58 and 137 are very slight and the clearance 137 may be somewhat greater in dimension than the clearance 58. However, for the purpose of illustration and description, the clearance spaces 58 and 137 are shown exaggerated on a larger scale than they actually are, for clarity of illustration.

Also, it is importatnt to note at this time that the radial thickness of the annular pilot portion 68 bite ring 61 must always be less than the radial spacing between the upper end of wedge head 51 and the internal cylindrical surface 139 of steel band 111 so that the pilot portion 68 can enter between the wedge head 51 and the steel band 111 during opening of the mold as in FIG. 26, or during closing of the mold as in FIGS. 19 and 20.

Figure 12:
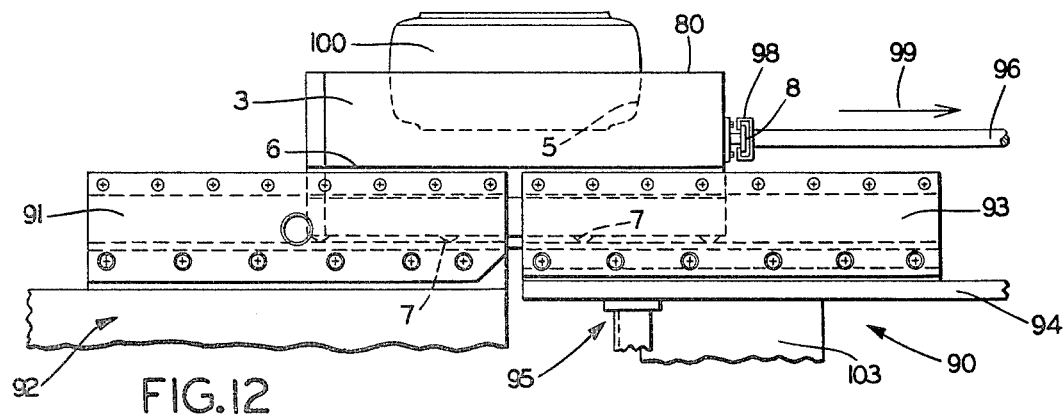
FIG. 12 is a diagrammatic side elevation of a bottom mold plate being transferred at the demolding station from the mold carrier table to the mold service table, illustrating a molded tire in the bottom mold plate.

The molded tire 100 with its solid rubber tread portion 118 bonded to the steel band 111 remains in the cavity of the bottom mold plate 3 as shown, for example, in FIG. 12, during continued upward movement of the top mold plate 2 and its assembled components, to completely open position.

The new molds for injection molding of solid steel-banded press-on industrial rubber tires, having the construction, components, and the described interrelated and interacting relationships, comprising the top and bottom mold plate assemblies which function during mold closing, tire molding and curing, and mold opening, as described, may be used with multi-stage injection molding equipment and obtain numerous advantages described below.

The operation of an eight-station unit shown diagrammatically in FIGS. 1 through 6 may use any number of molds for different sized tires up to eight different molds as previously indicated. One of the new molds is mounted at each of the eight stations on a mold carrier indicated generally at 120 carried by the revolving table 92.

At each station, the bottom mold plate 3 assembly is mounted in a transfer guideway 91. The top mold plate 2 assembly is mounted at the lower end of a plunger 121 extending downward from a fast acting hydraulic cylinder 122 mounted on a bolster 123 at the top of each mold carrier 120. The bolster 123 with its arms 125 is mounted on the three main columns 126 of the mold carrier 120.

The mold at the injection station 89 closed (FIG. 2) by actuation of the fast acting hydraulic cylinder 122 and when closed locking bolts 124, three in number, carried by the plunger 121 are rotated to engage under the three arms 125 of the bolster 123 to lock the top and bottom mold plates 2 and 3 closed. The main high tonnage hydraulic pressure means exerting force upward below the bottom mold plate 3, carried by the revolving table at the bottom of each mold carrier 120 holds the molds closed under high tonnage pressure. This pressure may be of the order of 500 metric tons pressure reacting against the locking bolts 124 and bolster 123 which hold the mold closed.

The lower end of the plunger 121 on which the top mold plate 2 is mounted may have electric heating elements preferably with thermostatic controls to maintain a predetermined curing temperature in the range of about 300° F. to 330° F. for the particular rubber compound injected into the mold.

A typical multi-station injection molding installation may include an injection unit generally indicated at 127.

Figure 3:
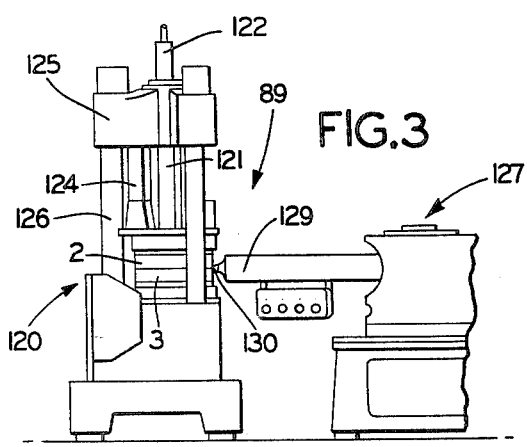
FIG. 3 is a view similar to FIGS. 1 and 2 illustrating rubber compound injection mechanism in position to inject the rubber into a closed and locked mold on a mold carrier at the injection station.
Figure 4:
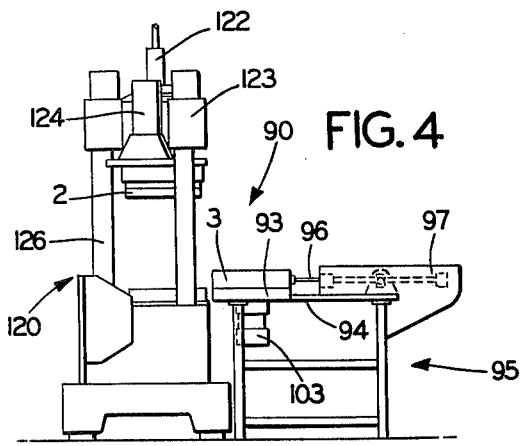
FIG. 4 is a view similar to portions of FIGS. 1, 2 and 3 showing a mold carrier at a final or eighth demolding station with the mold open and the bottom mold plate withdrawn from the mold carrier, and deposited on a mold service table for removal of a molded tire from the bottom mold plate.
Figure 5:
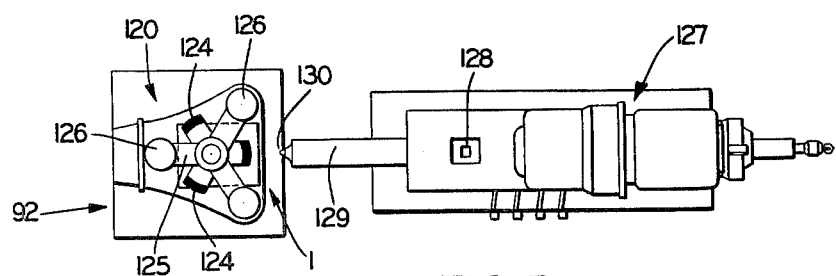
FIG. 5 is a diagrammatic top plan view of the equipment shown in FIG. 1.

Uncured rubber compound stock in any desired form, usually strip form, is fed through feed opening 128 to a supply compartment for a screw plasticizer rotating in a barrel to plasticize and beat the compound and inject the same when the injection head 129 is moved to injection position coupled with a mold as illustrated in FIG. 3 and 6. At this time the injection nozzle 130 is seated in the sprue opening 85 of the closed mold (FIG. 8).

During plasticizing in the barrel and injection head 129, the rubber compound becomes heated from developed friction. If necessary, the plasticizing heating of the compound may be augmented, controlled or cooled to provide plasticized rubber compound, as injected, having a temperature approaching the curing temperature of the particular compound injected.

Injection of the rubber compound into the mold cavity proceeds through sprue 85 formed by sprue formations 70 and 79 (FIGS. 8 and 22) and runners formed by runner formations 72, 73, 82 and 83 (FIGS. 15 and 16) and through the injection gate 107 formed by gate portions 74 and 84 (FIG. 30) into the mold cavity until the mold cavity is filled. During such injection, gases in the runners and mold cavity are removed to enable complete mold fill with rubber compound, by the vacuum maintained in the vacuum chamber 86. Normally the amount of rubber compound injected into the mold cavity is controlled by the injection unit 127 so that the mold is completely filled without overfill. However, in order to assure complete filling, any overfill of rubber compound is extruded through the vacuum gate 110 into the vacuum and overflow runner 78-88.

During injection, due to friction developed as the injected rubber compound moves through the sprue, runners and slight clearance injection gate 107 further heats the compound to the cure temperature of the particular rubber compound. This is one of the known benefits of injection molding which is advantageous in injection molding solid industrial rubber tires. Thus, during operation of multi-station molding equipment the compound, as a result of injection, has an internal temperature, when the mold cavity has been injected completely, at the desired curing temperature and it is only necessary to supply heat during curing in a sufficient amount to maintain such desired curing temperature.

Solid steel-banded industrial rubber tires of the general type illustrated have various steel band diameters and widths and various rubber tread dimensions. The molds for the normal range of tire sizes may require from say 15 to 35 pounds of rubber compound to fill the mold cavities around the steel bands. Further, because of the tremendous required pressures existing during injection and curing, the rubber compound has a tendency to try to leak or escape between mating surfaces of mold plates and their assembled components. Further, these pressures also tend to bulge the steel tire bands away from the cavity into which the rubber compound is injected.

Such rubber leakage or the formation of what is commonly called "flash" must be prevented. Otherwise expensive and time-consuming cleaning operations to clean the mold cavity and mold plates and components must be carried out to remove flash after each product has been molded.

In accordance with the invention, leakage of rubber compound during injection and curing, and the consequent formation of flash, is prevented by the interaction between other components and the top and bottom bite rings 61 and 20, since the bite rings seal against the ends of the steel band and seat and seal against the conical recesses 44 and 15 of the top and bottom mold plates 2 and 3 when the mold plates are closed, locked and held under the high tonnage molding pressure indicated.

Referring to FIG. 21, since all mating surfaces in the regions at the ends of the steel band 111 are sealed, there is no flash formed at and around the mold components at these locations. The only other locatiions where flash and excess rubber can collect, which must be removed from the cured tire, is along the injection and vacuum gates 107 and 110. This flash is readily trimmed and separated from the mold plates when the mold is opened and can readily be removed from the cured tire.

A further characterizing feature of the new mold construction and the interaction of the bite rings 61 and 20 with other components, involves the split ring wedge ring 56, the wedge member 48, and the sping controlled movable mounting of the top knockout ring 60 on the wedge member 48. This interaction functions to prevent distortion of the steel band 111 during injection and curing, and also functions to knock the molded tire out of the top mold plate when opening the mold as well as to dislodge the split ring wedge ring from pressure contact within the steel band.

Figure 2:
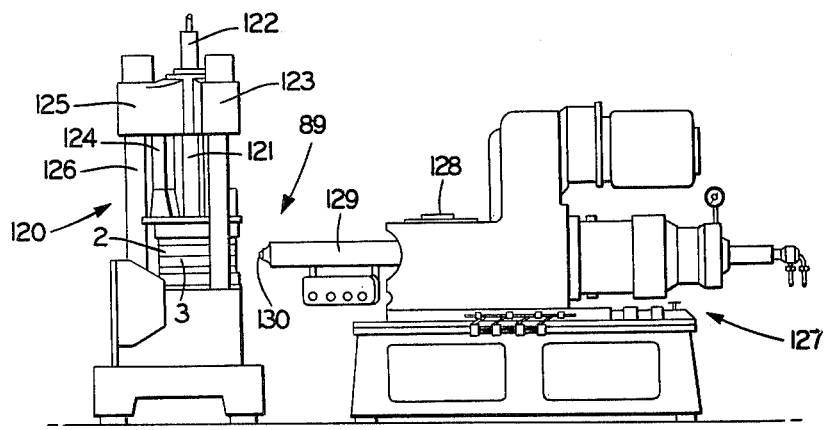
FIG. 2 is a diagrammatic view similar to FIG. 1 showing mold plate sections closed and locked in a mold carrier at the injection station of FIG. 1.

After a mold injection step has been completed at injecton station 89, the injection head 129 is withdrawn to the position shown in FIG. 2, and upon indexed rotation of the revolving table 92 each mold carried by each of the remaining seven mold carriers 120 is successively injected, one at a time, at the injection station 89.

Meanwhile, when one of the molds on a carrier arrives at the demolding station 90, the locking bolts 124 are rotated to unlocked position and the plunger 121 is raised to open the mold in the manner described. During the time interval or cycle for an injected mold to be moved from the injection station 89 to the demolding station 90, the curing temperature of the compound in the mold is maintained as described.

When the open mold arrives at the demolding station 90 (FIGS. 4, 6 and 11) the transport drawbar has engaged the T-head 8 on the bottom mold plate 3 as shown in FIG. 11. The drawbar 96 then is moved in the direction of the arrow 99 (FIG. 12) to the proper location on the knockout table 95 where actuation of the knockout ram 102 knocks the cured tire 100 out of the bottom mold plate 3 as shown in FIG. 13.

The tire 100 may be removed by handling equipment from the base knockout plate 19. The knockout pin 21 then is lowered and the bottom mold plate 3 is returned by the transport drawbar 96 to its transport guideway 91 on the mold carrier. When so returned, the open mold components at the demolding station 90 are ready to be moved on the revolving table 92 to the injection station 89 for another cycle of operation.

A usual curing time, depending upon the tire size, for steel-banded solid industrial rubber tires produced by injecton molding as described may be from ten to fourteen minutes in contrast with the two- to three-hour time cycle or curing time for the compression molding of similar solid industrial rubber tires.

Further, and equally important, are the improved characteristics of injection molded solid industrial rubber tires. Fatigue or destruction tests have been performed on injection molded tires which show a better tire life than compression molded tires.

Figure 32:
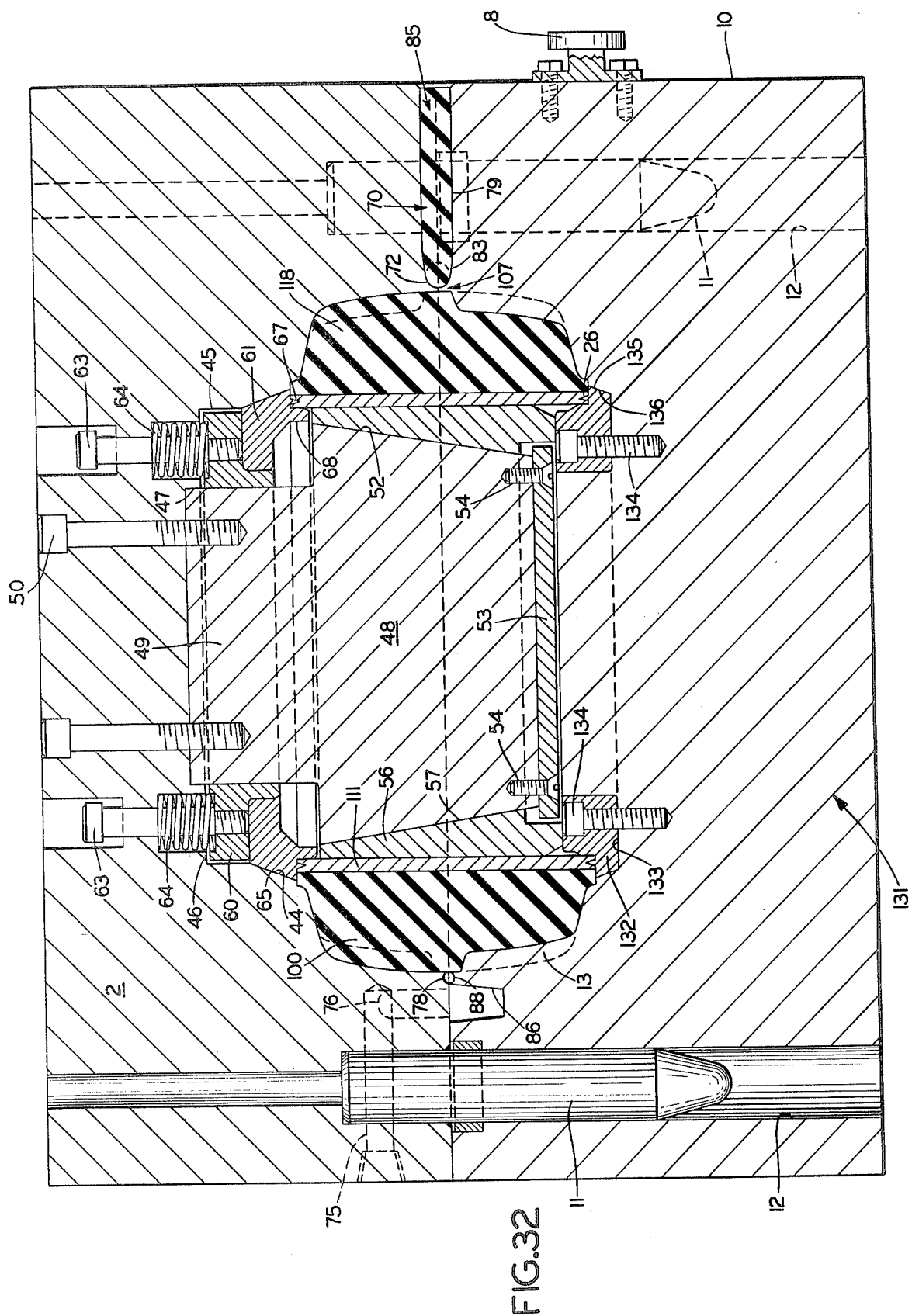
FIGS. 32 and 33 are views similar to FIG. 22 showing two modified forms of bottom mold plate.

A modified form of construction of the bottom mold plate member is shown in FIG. 32. The bottom mold plate member generally indicated at 131 omits a base knockout plate and the bottom bite ring 132 is received in the bottom recess 133 of the bottom mold plate 131 to which it is bolted at 134. In mounting the bottom bite ring 132 in the bottom mold plate 131 complementary annular conical surfaces 135 and 136 formed, respectively, on the bite ring and in the mold plate recess are seated as described in connection with the bottom mold plate 3; and are sealed against injected rubber leakage by the high pressure maintained when the mold is closed and the mold plate members are locked together under pressure. Complementary conical surfaces 135 and 136, however, are not necessary on the bottom bite ring 132, because there is no place for rubber to leak to between the bite ring and the mold cavity recess in which the bite ring is seated, in the bottom mold plate 131.

Otherwise, the construction of and relationship of the modified bottom mold plate 131 to other components of the mold formed with a top mold plate 2 are the same as described in relation to the construction and operation of the mold illustrated, for example, in FIG. 22.

Figure 33:
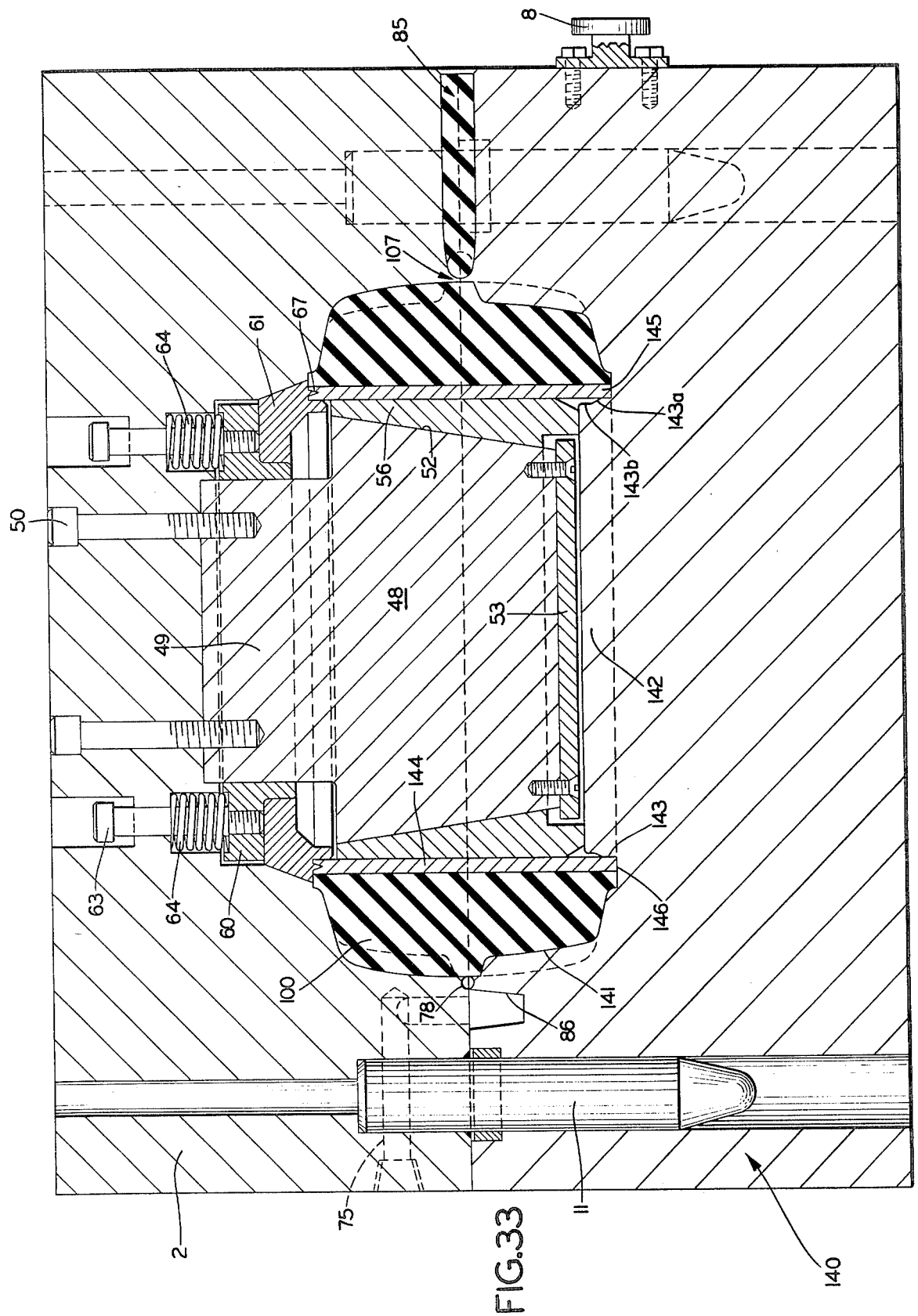

Another modified form of construction of the bottom mold plate member is shown in FIG. 33. The bottom mold plate member generally indicated at 140 is somewhat similar to the bottom mold plate member 131 of FIG. 32 but also omits a bottom bite ring and its annular V-shaped projection. The bottom mold plate member 140 has a simple construction with a tread-forming cavity portion 141 formed therein similar to the tread-forming portion 113 and FIG. 22. However, there is no recess in the bottom plate member 140 similar to the recess 133 in FIG. 32.

The inner portion of the mold cavity of bottom mold plate member 140 is formed with a raised annular pilot portion 142 extending axially of the mold cavity formed with a cylindrical surface 143 which functions like the cylindrical wall 30 of the bottom bite ring 20 in FIG. 22. The cylindrical surface 143 is connected by a conical pilot wall 143a with a smaller diameter cylindrical head surface 143b.

Thus, when a steel band 144 is inserted into the cavity of the bottom mold plate member 140, the pilot portion 143 locates the steel band 144 concentrically within the mold cavity with its lower end 145 seated on the horizontal annular surface 146 which connects the tread-forming cavity portion 141 with the annular pilot portion 143 of the bottom mold plate member 140.

Otherwise the construction and relationship of the modified bottom mold plate member 140 to other components of the mold formed with a top mold plate member 2 are the same as described in relation to the construction and operation of the mold illustrated, for example, in FIG. 22.

Thus, when the mold is closed and the top mold plate member 2 is mated with the bottom mold plate member 140, the top bite ring 61 is seated in its conical recess seat 65 in the top mold plate 2 against the biasing by springs 64, and the V-shaped annular projection 67 on the bite ring 61 is wedge seated, by band metal deformation in the upper end edge of the steel band 144 by the high pressure maintained when the mold is closed and the mold plate members are locked together under pressure. During such mold closing movement, the lower end 145 of the steel band 144 is pressed in tight sealing engagement against the horizontal annular surface 146.

In this manner the tread-forming cavity portions of the top and bottom mold plate members are sealed against leakage of injected rubber past the ends of the steel band 144 into other portions and against other components of the mold.

Accordingly, the new mold construction and molding procedure for injection molding steel-banded solid industrial rubber tires avoid the difficulties and disadvantages of prior compression molding of such tires, provided procedures and equipment which enable the first known production of injection molded steel-banded industrial rubber tires, provide and injection molded tire product having high quality characteristics, eliminate the long curing time heretofore required for compression molding such steel-banded solid industrical rubber tires, provide equipment and procedures satisfying the objectives stated, eliminate difficulties heretofore encountered in the art, and solve problems and satisfy needs that have existed in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the new equipment and procedures of the invention are by way of example and the scope of the invention is not limited to the exact details shown or described, since solid steel-banded industiral rubber tires of many sizes may be manufactured in accordance with the inventions.

Having now described the features and principles of the invention, the manner in which the new steel-banded solid tire injection molds are constructed and used, the functioning of components thereof, and the advantageous, new and useful results obtained; the new and useful structures, devices, components, elements, combinations, arrangements, uses, relationships and procedures are set forth in the appended claims.

We claim:

1. In a method of injection molding and curing rubber compound with a steel band in a cavity formed in a mold to bond rubber injected into the cavity to the band during curing to form a solid steel-banded industrial rubber tire; the steps of providing separated top and bottom mold plate members having cavity portions therein; locating in recesses formed in respective plate members top and bottom hardened steel bite rings having conical circumferential surfaces which are complementary to conical surfaces formed in said recesses; providing annular V-shaped projections on said bite rings; biasing said top bite ring away from said top plate member conical recess portion; inserting a steel band in the bottom mold plate member cavity portion; piloting said steel band on the bottom bite ring during insertion to a position concentric with the bottom mold plate cavity portion; relatively moving said top and bottom mold plate members toward each other to mate said plate members and form a closed mold cavity; during said relative movement piloting said biased top bite ring into concentric engagement with the upper end of said steel band; meanwhile engaging said top and bottom bite ring annular V-formations with the ends of said steel band and wedge seating by band metal deformation said V-shaped formations into the metal band ends to seal the bite rings against the band ends; meanwhile seal-pressure-seating said conical bite ring surfaces in said plate member conical recess portions, and also pressure-mating parting faces of said top and bottom mold plates; holding the steel band under pressure against interior distortion; pressure injecting rubber compound at compound curing temperature into the cavity formed by the plate member cavity portions and the steel band; curing the injected rubber and maintaining molding pressure on the mated mold plate members and the seated and sealed bite rings and steel band during curing; maintaining the temperature of the injected rubber compound at its curing temperature during curing; then after curing, separating the mold plate members, and during initial separation knocking the cured steel-banded tire out of the top mold plate member cavity; then releasing distortion preventing pressure from the steel band; and then removing said tire from the bottom mold plate member cavity.

2. In a method of injection molding and curing rubber compound with a steel band in a cavity formed in a mold to bond rubber injection into the cavity to the band during curing to form a solid steel-banded industrial rubber tire; the steps of providing separated top and bottom mold plate members having cavity portions therein; locating in recesses formed in respective plate members top and bottom hardened steel bite rings at least the top bite ring of which bite rings has a conical circumferential surface which is complementary to a conical surface formed in said top plate member recess; providing annular V-shaped projections on said bite rings; biasing said top bite ring away from said top plate members conical recess portion; inserting a steel band in the bottom mold plate member cavity poriton; piloting said steel band on the bottom bite ring during insertion to a position concentric with the bottom mold plate cavity portion; relatively moving said top and bottom mold plate members toward each other to mate said plate members and form a closed mold cavity; during said relative movement piloting said biased top bite ring into concentric engagement with the upper end of said steel band; meanwhile engaging said top and bottom bite ring annular V-formations with the ends of said steel band and wedge seating by band metal deformation said V-shaped formations into the metal band ends to seal the bite rings against the band ends; meanwhile seal-pressure-seating said top conical bite ring surface in said top plate member conical recess portion, and also pressure-mating parting faces of said top and bottom mold plates; holding the steel band under pressure against interior distortion; pressure injecting rubber compound at compound curing temperature into the cavity formed by the plate member cavity portions and the steel band; curing the injected rubber and maintaining molding pressure on the mated mold plate members and the seated and sealed bite rings and steel band during curing; maintaining the temperature of the injected rubber compound at its curing temperature during curing; then after curing, separating the mold plate members, and during initial separation knocking the cured steel-banded tire out of the top mold plate member cavity; then releasing distortion preventing pressure from the steel band; and then removing said tire from the bottom mold plate member cavity.

3. In a method of injection molding and curing rubber compound with a steel band in a cavity formed in a mold to bond rubber injected into the cavity to the band during curing to form a solid steel-banded industrial rubber tire; the steps of providing separated top and bottom mold plate members having cavity portions therein; locating in a recess formed in said top plate member a hardened steel bite ring having a conical circumferential surface which is complementary to a conical surface formed in said top plate member recess; providing an annular V-shaped projection on said bite ring; biasing said bite ring away from said top plate member conical recess portion; inserting a steel band in the bottom mold plate member cavity portion; piloting said steel band during insertion to a position concentric with the bottom mold plate cavity portion; relatively moving said top and bottom mold plate members toward each other to mate said plate member and form a closed mold cavity; during said relative movement piloting said biased bite ring into concentric engagement with the upper end of said steel band; meanwhile engaging said bite ring annular V-formation with the top end of said steel band and wedge-seating by band metal deformation said V-shaped formation into the metal band top end to seal the bite ring against the band top end while at the same time the metal band bottom end is pressed in tight sealing against a horizontal annular surface in the bottom mold plate member; meanwhile seal-pressure-seating said conical bite ring surface in said top plate member conical recess portion, and also pressure-mating parting faces of said top and bottom mold plates; holding the steel band under pressure against interior distortion; pressure injecting rubber compound at compound curing temperature into the cavity formed by the plate member cavity portions and the steel band; curing the injected rubber and maintaining molding pressure on the mated mold plate members and the seated and sealed bite ring and steel band during curing; maintaining the temperature of the injected rubber compound at its curing temperature during curing; then after curing, separating the mold plate members, and during initial separation knocking the cured steel-banded tire out of the top mold plate member cavity; then releasing distortion preventing pressure from the steel band; and then removing said tire from the bottom mold plate member cavity.

4. A mold for injection molding and curing rubber compound with a steel band inserted in a cavity formed in the mold to bond rubber injected into the cavity to the band during curing thereby forming a solid steel-banded industrial rubber tire, including mating first and second mold plate members defining with a steel band inserted between the plate members a rubber tread-forming cavity surrounding the band when the plate members are mated under pressure; a hardened steel bite ring located within a recess formed in the first mold plate member adjacent the tread-forming cavity portion therein; the bite ring being movable in its recess and having a conical circumferential surface seated under sealing pressure in a complementary conical portion of the first mold plate member recess when the mold plate members are mated; the bite ring having a V-shaped annular projection wedge seated, by band metal deformation when the plate members are pressure mated, in one end of the steel band insert which defines a portion of said cavity; said bite ring being mounted on a first knockout member movably mounted on the first mold plate; said first knockout member being biased toward the second mold plate member when the mold is closed; the molded steel-banded tire being knocked out by the biased first knockout member from the first plate member cavity portion upon opening the mold; means for injecting rubber compound into and for extracting gases from said cavity; and radially expansible means operative on closing the mold to internally engage a steel band insert and hold it against distortion from high injection pressure during rubber injection and during curing of injected rubber in said cavity.

5. The mold defined in claim 4 in which the tread-forming cavity portion of the second mold plate member has an annular pilot portion extending axially within said tread-forming mold cavity portion; in which said pilot portion has a cylindrical surface extending from a horizontal annular surface which connects said tread-forming cavity portion with said pilot portion; and in which a second end of said steel band insert is adapted to telescope over said cylindrical pilot portion surface when inserted into the second mold plate member to center the band in the tread-forming cavity portion of said second mold plate member.

6. The mold defined in claim 5 in which said pilot portion has a pilot head provided with an outer cylindrical surface of smaller diameter than its cylindrical surface which engages a steel band end portion; and in which said pilot head cylindrical surface is connected with the steel-band-engaging cylindrical surface by a conical outwardly downwardly flared pilot wall.

7. The mold defined in claim 4 in which said first and second mold plate members have parting faces which contact each other when said plate members are mated under pressure to complete the formation of a mold cavity; in which said means for injecting rubber compound into said cavity includes as a part of said first and second mold plate members, mating sprue, runner and gate formations in the parting faces of said first and second mold plate members through which rubber compound is injected from an injection unit into said cavity; in which said runner formations extend along a circumferential portion of and communicate through said gate formations with the cavity halves of the first and second mold plate members; and in which said gate formations in the parting faces of said first and second mold plate members have a very slight injection gate clearance space therebetween so as to by developed friction, heat to the curing temperature of the rubber compound injected, said rubber compound as it passes through said gate into said cavity.

8. The construction defined in claim 7 in which the injection gate clearance space dimension is of the order of 0.020 inches to 0.060 inches.

9. The construction defined in claim 4 in which said first and second mold plate members have parting faces which contact each other when said plate members are mated under pressure to complete the formation of a mold cavity; in which said means for injecting rubber compound into said cavity includes as a part of said first and second mold plate members, mating injection sprue, runner and gate formations in the parting faces of said first and second mold plate members through which rubber compound is injected from an injection unit into said cavity; in which mating vacuum runner and overflow and gate formations are formed in the parting faces of said first and second mold plate members through which gases are extracted from said cavity to permit complete fill of said cavity with injected rubber compound; in which said vacuum runner and overflow formations extend along a circumferential portion of and communicate through said vacuum gate formations with the cavity halves of the first and second mold plate members; in which a vacuum chamber is formed in the parting face of said second mold plate member communicating with said vacuum runner and overflow formations; and in which passages are formed in said first mold plate member adapted to be connected with a source of vacuum and communicating at the parting face of said first mold plate member with said vacuum chamber.

10. The construction defined in claim 9 in which the mating injection gate formations form an injection gate with a clearance space having a predetermined dimension; and in which said vacuum gate formations form a vacuum gate clearance space having a dimension less than said predetermined injection gate clearance space dimension.

11. The mold defined in claim 4 in which a knockout table is provided adjacent the location during a molding and curing operation of said second mold plate member; and in which transfer means are provided to move said second mold plate member with a cured tire retained in its mold cavity portion to said adjacent knockout table.

12. The mold defined in claim 11 in which said transfer means includes a first transfer guideway member on which said second mold plate member rests during a molding and curing operation, a second transfer guideway member mounted on said knockout table, the second mold plate member having roller means on which it is supported on said first transfer guideway means during a molding and curing operation, laterally spaced channel-shaped guide means located on each of said first and second transfer guideway members longitudinally aligned with each other, the second mold plate member having a front end and laterally spaced sides, transfer guide slots formed in said second mold plate member sides slidably engageable with said laterally spaced aligned first and second transfer guideway member channel-shaped guide means, and drawbar means engageable with said second mold plate member for moving said bottom mold plate member on said roller means to and fro between said first and second transfer guideway members.

13. The mold defined in claim 12 in which said drawbar means for moving said second mold plate member to and fro between said first and second transfer guideway members includes a power actuated reciprocable transfer drawbar, and T-head and T-slot coupling means respectively mounted on said second mold plate member and said drawbar releasably engageable for moving said second mold plate means when said drawbar is actuated.

14. The mold defined in claim 4 in which said radially expansible means includes, a wedge member having a shank connected to a recess portion of said first mold plate member extending axially of the plate member tread-forming cavity and terminating in an enlarged wedge head, a downwardly inwardly extending circumferential conical surface formed on said wedge head, a split ring surrounding said wedge head, and means supporting said split ring on said wedge head; in which the first mold plate member has a parting face surrounding the open end of its tread-forming cavity; in which the conical wedge head surface projects beyond the parting face of said first mold plate member; and in which said split ring has an inner conical surface complementary to said wedge head conical surface, and an outer cylindrical surface adapted on closing the mold to be telescoped within and to internally engage a steel band insert in said second mold plate member tread-forming cavity.

15. The mold defined in claim 14 in which said first biased knockout member and said bite ring mounted thereon are mounted on and are movable relative to said wedge member shank biased toward said wedge head;

in which said first knockout member is ring-like and has a circumferential conical surface formed as an axial continuation of said bite ring conical surface; in which said conical first knockout ring and bite ring surfaces seat under pressure sealing engagement in said complementary conical portion of said first mold plate member recess when said mold plate members are mated; and in which spring means are mounted on the first mold plate member to bias said first knockout ring member and said bite ring mounted thereon out of seated sealing engagement with said first mold plate member recess to thereby knock a molded tire out of the rubber tread-forming cavity portion of said first mold plate member when a tire has been cured in the mold and the mated mold plate members are initially moved relatively to each other to separate the mold plate members.

16. The mold defined in claim 15 in which during continued relative separating movement of said mold plate members and the consequent continued spring biased movement of said bite ring out of said seated sealing engagement with said first mold plate member recess, said bite ring pilot portion engages said split ring and moves said split ring relative to said wedge head to release split ring engagement with the steel band of the tire cured in the mold, thereby permitting relative separation movement of said first and second mold plate members to continue for fully opening the mold.

17. The mold defined in claim 14 in which on closing the mold and telescoping the wedge head and split ring supported thereon within a steel band insert in said second mold plate member cavity, the split ring engages said pilot portion, and in which during final closing movement of said first mold plate member to mate with said second mold plate member said wedge head moves axially relative to the split ring engaged with said pilot portion and expands said split ring into distortion resisting pressure engagement with the inner surface of said steel band insert.

18. The mold defined in claim 14 in which the smaller diameter end portion of said wedge head is provided with annular shoulder means; and in which said split ring normally is supported on said shoulder means when said first and second mold plate members are axially separated in open position.

19. The mold defined in claim 18 in which the wedge head shoulder means comprises a plate mounted on the outer end of the wedge head having an annular edge shoulder portion projecting radially outwardly of the conical wedge head surface; and in which said split ring has an annular shoulder engageable with said plate shoulder portion.

20. A mold for injection molding and curing rubber compound with a steel band inserted in a cavity formed in the mold to bond rubber injected into the cavity to the band during curing thereby forming a solid steel-banded industrial rubber tire, including mating first and second mold plate members defining with a steel band inserted between the plate members a rubber tread-forming cavity surrounding the band when the plate members are mated under pressure; first and second hardened steel bite rings located within recesses formed in the respective mold plate members adjacent the tread-forming cavity portions therein; at least the first bite ring being movable in its respective recess and having a conical circumferential surface seated under sealing pressure in a complementary conical portion of the first mold plate member recess when the mold plate members are mated; each bite ring having a V-shaped annular projection wedge seated, by band metal deformation when the plate members are pressure mated, in opposite ends of the steel band insert which defines a portion of said cavity; said first bite ring being mounted on a first knockout member movably mounted on the first mold plate; said first knockout member being biased toward the second mold plate member when the mold is closed; the molded steel-banded tire being knocked out by the biased first knockout member from the first plate member cavity portion upon opening the mold; means for injecting rubber compound into and for extracting gases from said cavity; and radially expansible means operative on closing the mold to internally engage a steel band insert and hold it against distortion from high injection pressure during rubber injection and during curing of injected rubber in said cavity.

21. The mold defined in claim 20 in which said second bite ring also has a conical circumferential surface seated under sealing pressure in a complementary conical portion of the second mold plate member recess when the mold plate members are mated; in which enlarged ends of the bite ring conical surfaces terminate in flat annular horizontal shoulder surfaces having axially extending annular pilot portions spaced radially inward of said enlarged ends; in which said annular V-shaped projections are formed on said shoulder surfaces in alignment intermediate respective pilot portions and enlarged ends; in which said pilot portions have outer axially aligned cylindrical surfaces adapted to telescope into and engage opposite end portions of the inner cylindrical surface of a steel band insert to center the band in the mold cavity as the V-shaped bite ring projections wedge seat by band metal deformation in opposite ends of the band insert when said mold plate members are pressure mated together.

22. The mold defined in claim 21 in which said second bite ring pilot portion has a pilot head provided with an outer cylindrical surface of smaller diameter than its cylindrical surface which engages a steel band end portion; and in which said pilot head cylindrical surface is connected with the steel band engaging cylinder surface by a conical outwardly downwardly flared pilot wall.

23. The mold defined in claim 20 in which said first and second mold plate members have parting faces which contact each other when said plate members are mated under pressure to complete the formation of a mold cavity; in which said means for injecting rubber compound into said cavity includes as a part of said first and second mold plate members, mating sprue, runner and gate formations in the parting faces of said first and second mold plate members through which rubber compound is injected from an injection unit into said cavity; in which said runner formations extend along a circumferential portion of and communicate through said gate formations with the cavity halves of the first and second mold plate members; and in which said gate formations in the parting faces of said first and second mold plate members have a very slight injection gate clearance space therebetween so as to by developed friction, heat to the curing temperature of the rubber compound injected, said rubber compound as it passes through said gate into said cavity.

24. The mold defined in claim 23 in which the injection gate clearance space dimension is of the order of 0.020 inches to 0.060 inches.

25. The mold defined in claim 29 in which said first biased knockout member and said first bite ring mounted thereon are mounted on and are movable relative to said wedge member shank biased toward said wedge head; in which said first knockout member is ring-like and has a circumferential conical surface formed as an axial continuation of said first bite ring conical surface; in which said conical first knockout ring and first bite ring surfaces seat under pressure sealing engagement in said complementary conical portion of said first mold plate member recess when said mold plate members are mated; and in which spring means are mounted on the first mold plate member to bias said first knockout ring member and said first bite ring mounted thereon out of seated sealing engagement with said first mold plate member recess to thereby knock a molded tire out of the rubber tread-forming cavity portion of said first mold plate member when a tire has been cured in the mold and the mated mold plate members are initially moved relatively to each other to separate the mold plate members.

26. The mold defined in claim 25 in which during continued relative separating movement of said mold plate members and the consequent continued spring biased movement of said first bite ring out of said seated sealing engagement with said first mold plate member recess, said first bite ring pilot portion engages said split ring and moves said split ring relative to said wedge head to release split ring engagement with the steel band of the tire cured in the mold, thereby permitting relative separation movement of said first and second mold plate members to continue for fully opening the mold.

27. The mold defined in claim 20 in which said first and second mold plate members have parting faces which contact each other when said plate members are mated under pressure to complete the formation of a mold cavity; in which said means for injecting rubber compound into said cavity includes as a part of said first and second mold plate members, mating injection sprue, runner and gate formations in the parting faces of said first and second mold plate members through which rubber compound is injected from an injection unit into said cavity; in which mating vacuum runner and overflow and gate formations are formed in the parting faces of said first and second mold plate members through which gases are extracted from said cavity to permit complete fill of said cavity with injected rubber compound; in which said vacuum runner and overflow formations extend along a circumferential portion of and communicate through said vacuum gate formations with the cavity halves of the first and second mold plate members; in which a vacuum chamber is formed in the parting face of said second mold plate member communicating with said vacuum runner and overflow formations; and in which passages are formed in said first mold plate member adapted to be connected with a source of vacuum and communicating at the parting face of said first mold plate member with said vacuum chamber.

28. The mold defined in claim 27 in which the mating injection gate formations form an injection gate with a clearance space having a predetermined dimension; and in which said vacuum gate formations form a vacuum gate clearance space having a dimension less than said predetermined injection gate clearance space dimension.

29. The mold defined in claim 20 in which said radially expansible means includes, a wedge member having a shank connected to a recess portion of said first mold plate member extending axially of the plate member tread-forming cavity and terminating in an enlarged wedge head, a downwardly inwardly extending circumferential conical surface formed on said wedge head, a split ring surrounding said wedge head, and means supporting said split ring on said wedge head; in which the first mold plate member has a parting face surrounding the open end of its tread-forming cavity; in which the conical wedge head surface projects beyond the parting face of said first mold plate member; and in which said split ring has an inner conical surface complementary to said wedge head conical surface, and an outer cylindrical surface adapted on closing the mold to be telescoped within and to internally engage a steel band insert in said second mold plate member tread-forming cavity.

30. The mold defined in claim 29 in which on closing the mold and telescoping the wedge head and split ring supported thereon within a steel band insert in said second mold plate member cavity, the split ring engages said second bite ring, and in which during final closing movement of said first mold plate member to mate with said second mold plate member said wedge head moves axially relative to the split ring engaged with said second bite ring and expands said split ring into distortion resisting pressure engagement with the inner surface of said steel band insert.

31. The mold defined in claim 29 in which the smaller diameter end portion of said wedge head is provided with annular shoulder means; and in which said split ring normally is supported on said shoulder means when said first and second mold plate members are axially separated in open position.

32. The mold defined in claim 31 in which the wedge head shoulder means comprises a plate mounted on the outer end of the wedge head having an annular edge shoulder portion projecting radially outwardly of the conical wedge head surface; and in which said split ring has an annular shoulder engageable with said plate shoulder portion.

33. The mold defined in claim 20 in which said second bite ring is mounted on a second knockout member; in which said second knockout member is axially movably mounted in said second mold plate member recess; in which said second mold plate has a parting face, and a bottom face; in which an axial opening extends in the second mold plate member from the second mold plate member recess to said bottom face; in which a knockout pin is mounted on said second knockout member extending axially toward said bottom face in said knockout opening; and in which there are means releasably engageable with said knockout pin for moving the knockout pin in said knockout opening toward said parting face to knock the second knockout member and the second bite ring mounted thereon and a steel banded tire cured in the mold cavity whose band is engaged with the second bite ring out of the mold cavity portion in said second mold plate member.

34. The mold defined in claim 33 in which a knockout table is provided adjacent the location during a molding and curing operation of said second mold plate member; and in which transfer means are provided to move said second mold plate member with a cured tire retained in its mold cavity portion to said adjacent knockout table.

35. The mold defined in claim 34 in which said transfer means includes a first transfer guideway member on which said second mold plate member rests during a molding and curing operation, a second transfer guideway member mounted on said knockout table, the second mold plate member having roller means on which it is supported on said first transfer guideway means during a molding and curing operation, laterally spaced channel shaped guide means located on each of said first and second transfer guideway members longitudinally aligned with each other, the second mold plate member having a front end and laterally spaced sides, transfer guide slots formed in said second mold plate member sides slidably engageable with said laterally spaced aligned first and second transfer guideway member channel shaped guide means, and drawbar means engageable with said second mold plate member for moving said bottom mold plate member on said roller means to and fro between said first and second transfer guideway members.

36. The mold defined in claim 35 in which said drawbar means for moving said second mold plate member to and fro between said first and second transfer guideway members includes a power actuated reciprocable transfer drawbar, and T-head and T-slot coupling means respectively mounted on said second mold plate member and said drawbar releasably engageable for moving said second mold plate means when said drawbar is actuated.

37. The mold defined in claim 36 in which said knockout table and said second transfer guideway member are provided with knockout passage opening means aligned with the axial opening in said second mold plate member when the latter is located on said knockout table; in which power actuated reciprocable knockout ram means are mounted on said knockout table below said second transfer guideway member extending through said knockout passage opening means for moving said knockout pin axially toward the second mold plate member parting face to knock said knockout plate with a cured tire thereon out of the second mold plate member cavity portion; and releasable coupling means interengageable between said knockout rams means and said knockout pin.

38. The mold defined in claim 37 in which said releasable coupling means between said knockout ram means and said knockout pin includes, a central slot formed in the bottom face of the second mold plate member communicating with the lower end of said knockout pin and extending to the front end of the second mold plate member, a T-slot formed in the lower end of said knockout pin accessible to said central slot, and a T-head formed on said knockout ram means, whereby as the second mold plate member is transferred to the knockout table said central slot passes along said ram means T-head which projects into said slot and said T-head engages the knockout pin T-slot when the second mold plate member arrives at a position on the knockout table with the knockout pin axially aligned with said knockout ram means.

39. A mold for injection molding and curing rubber compound with a steel band inserted in a cavity formed in the mold to bond rubber injected into the cavity to the band during curing thereby forming a solid steel-banded industrial rubber tire, including mating first and second mold plate members defining with a steel band inserted between the plate members a rubber tread-forming cavity surrounding the band when the plate members are mated under pressure; first and second hardened steel bite rings movably contained within recesses formed in respective mold plate members adjacent the tread-forming cavity portions therein; the bite rings each having conical circumferential surfaces seated under sealing pressure in complementary conical portions of the recesses in respective mold plate members, and having V-shaped annular projections wedge seated, by band metal deformation when the plate members are pressure mated, in opposite ends of a steel band insert which defines a portion of said cavity; said bite rings being mounted on respective first and second knockout members movably mounted on their respective mold plate members; said first knockout member being biased toward the second knockout member when the mold is closed, the molded steel-banded tire being knocked out by the biased first knockout member from the first plate member cavity portion upon opening the mold; the second knockout member being movable to knock the molded tire out of the second plate member cavity portion after opening the mold; means for injecting rubber compound into and for extracting gases from said cavity; and radially expansible means operative on closing the mold to internally engage the steel band insert and hold it against distortion from high injection pressure during rubber injection and during curing of injected rubber in said cavity.

40. A mold for injecting molded solid steel-banded industrial rubber tires, including mating top and bottom mold plate means each including a plate having a parting face, an axially extending annular recess, and an annular tire tread-forming cavity portion extending from said face to said recess, each recess having an axially extending conical wedge surface; a top knockout member located in the top recess; an axially extending wedge member having a shank mounted in the top plate recess and an enlarged wedge head having a conical surface; the wedge head being radially spaced internally from said cavity and extending axially from the shank out of said cavity beyond the top plate parting face; the top knockout member being axially movably mounted on said shank biased toward the wedge head; a split ring supported on said wedge head having an outer cylindrical steel-tire-band-engageable surface and an inner conical surface surrounding and complementary to the wedge head conical surface; a first hardened steel bite ring mounted on the top knockout member; a second hardened steel bite ring mounted in said bottom plate recess; each bite ring having a shoulder and a pilot portion extending toward the other bite ring from such shoulder; each shoulder having an annular V-shaped projection extending from such shoulder toward the V-shaped projection formed on the other bite ring in circumferential alignment therewith; each shoulder terminating in a conical annular wedge surface complementary to and adapted to be seated within and in sealing relation with the respective plate conical recess surface; mating rubber compound injection sprue, runner and gate formations in the parting faces of said top and bottom plates communicating with a circumferential portion of the cavity formed by said top and bottom mold plate means tire tread-forming cavity portions when said mold plate means and their parting faces are mated and held under pressure; and vacuum means for extracting gases from said formed cavity during rubber compound injection.

41. A mold for injection molding solid steel-banded industrial rubber tires, including mating top and bottom mold plate means each including a plate having a parting face, an axially extending annular recess, and an annular tire tread-forming cavity portion extending from said face to said recess, each recess having an axially extending conical wedge surface; top and bottom knockout members located in the respective top and bottom recesses; an axially extending wedge member having a shank mounted in the top plate recess and an enlarged wedge head having a conical surface, the wedge head being radially spaced interiorly from said cavity and extending axially from the shank out of said cavity beyond the top plate parting face; the top knockout member being axially movably mounted on said shank biased toward the wedge head; a split ring supported on said wedge head having an outer cylindrical steel-tire-band-engageable surface and an inner conical surface surrounding and complementary to the wedge head conical surface; the bottom plate having a lower face spaced from its parting face and being formed with a knockout opening extending axially from said bottom plate recess to said lower face; the bottom knockout member having a knockout pin mounted thereon telescoped into and movable in said knockout opening; the top and bottom knockout members each having a hardened steel bite ring mounted thereon, each bite ring having a shoulder and a pilot portion extending toward the other bite ring from such shoulder, each shoulder having an annular V-shaped projection extending from such shoulder toward the V-shaped projection formed on the other bite ring in circumferential alignment therewith; each shoulder terminating in a conical annular wedge surface complementary to and adapted to be seated within and in sealing relation with the respective plate conical recess surface; mating rubber compound injection sprue, runner and gate formations in the parting faces of said top and bottom plates communicating with a circumferential portion of the cavity formed by said top and bottom mold plate means tire tread-forming cavity portions when said mold plate means have their parting faces mated and held under pressure; and vacuum means for extracting gases from said formed cavity during rubber compound injection.

* * * * *

UNITED STATES PATENT AND TRADEMARK OFFICE
CERTIFICATE OF CORRECTION

PATENT NO. : 4,257,994

DATED : March 24, 1981

INVENTOR(S) : RAYMOND F. LeBLANC et al

It is certified that error appears in the above-identified patent and that said Letters Patent are hereby corrected as shown below:

Page 1, 8th line of Abstract "bank" should be - band - ;
Column 2, line 31, "steelbanded" should be - steel-banded - ;
Column 4, line 35, "and" should be - end - ;
Column 6, line 6, "pate" should be - plate - ;
Column 6, line 63, "as" should be deleted;
Column 7, line 19, "bottem" should be - bottom - ;
Column 7, line 64, following the word "top", insert - mold - ;
Column 7, line 65, following the word "top", insert - bite - ;
Column 7, line 66, "bybolts" should be - by bolts - ;
Column 9, line 4, "83" should be - 84 - ;
Column 10, line 16, following the word "channel-shaped" insert the word - guide - ;
Column 10, line 53, "directin" should be - direction - ;
Column 11, line 46, "if" should be - is - ;
Column 14, line 48, after the numeral "89", insert the word - is - ;
Column 15, line 6, "FIG." should be - FIGS. - ;
Column 16, line 9, "locatiions" should be - locations - ;
Column 16, line 32, after the word "a" insert the word - mold - ;
Column 16, line 58, "injecton" should be - injection - ;
Column 18, line 8, "provided" should be - provide - ;
Column 18, line 10, "and" should be - an - ;
Column 18, line 28, "industiral" should be - industrial - ;
Column 19, line 17, "injection" should be - injected - ;

UNITED STATES PATENT AND TRADEMARK OFFICE
CERTIFICATE OF CORRECTION

PATENT NO. : 4,257,994

Page 2 of 2

DATED : March 24, 1981

INVENTOR(S) : RAYMOND F. LeBLANC et al

It is certified that error appears in the above-identified patent and that said Letters Patent are hereby corrected as shown below:

Column 19, line 28 (in Claim 2), "members" should be - member -;
Column 19, line 29 (in Claim 2), "poriton" should be - portion -;
Column 20, line 9 (in Claim 3), "member" should be - members - ;
Column 27, line 38 (in Claim 37), "rams" should be - ram - ;
Column 19, line 62, "foreing" should be - forcing - ;
Column 8, line 39, "compund" should be - compound - ;
Column 8, line 53, the numeral "74" should be - 75 -.

Signed and Sealed this

Eleventh Day of August 198

[SEAL]

Attest:

GERALD J. MOSSINGHOFF

Attesting Officer        Commissioner of Patents and Trademarks